US012655029B2

(12) United States Patent
Hodgkins et al.

(10) Patent No.: US 12,655,029 B2
(45) Date of Patent: Jun. 16, 2026

(54) METHOD FOR MANUFACTURE OF CRYSTALLINE MATERIAL HAVING A CHA FRAMEWORK IN THE PRESENCE OF ODSO

(71) Applicant: Saudi Arabian Oil Company, Dhahran (SA)

(72) Inventors: Robert Peter Hodgkins, Dhahran (SA); Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 721 days.

(21) Appl. No.: 18/152,429

(22) Filed: Jan. 10, 2023

(65) Prior Publication Data

US 2024/0239671 A1 Jul. 18, 2024

(51) Int. Cl.
*C01B 39/48* (2006.01)

(52) U.S. Cl.
CPC .......... *C01B 39/48* (2013.01); *C01P 2002/72* (2013.01)

(58) Field of Classification Search
CPC ............................ C01B 39/48; C01P 2002/72
See application file for complete search history.

(56) References Cited

U.S. PATENT DOCUMENTS 3,313,594 A 4/1967 Wilson
3,516,786 A 6/1970 Maher et al.
3,556,725 A 1/1971 Chiola et al.
4,544,538 A 10/1985 Zones
5,763,720 A 6/1998 Buchanan et al.
5,951,962 A 9/1999 Müller et al.
6,337,063 B1 1/2002 Rouleau et al.
7,435,863 B2 10/2008 Strohmaier et al.
7,923,522 B2 4/2011 Hamada et al.
10,781,168 B2 9/2020 Koseoglu et al.
10,793,782 B2 10/2020 Koseoglu et al.
10,807,947 B2 10/2020 Koseoglu et al.
10,927,318 B2 2/2021 Koseoglu et al.
11,027,983 B2 6/2021 Li et al.
(Continued)

FOREIGN PATENT DOCUMENTS

CN 102285666 A 12/2011
CN 102452663 A 5/2012
(Continued)

OTHER PUBLICATIONS

Itakura, Masaya, ("Synthesis of High-silica CHA Zeolite from FAU Zeolite in the Presence of Benzyltrimethylammonium Hydroxide", Chemistry Letters, vol. 37 (Year: 2008).*
(Continued)

*Primary Examiner* — Anthony J Zimmer
*Assistant Examiner* — Jaanzeb C Raja
(74) *Attorney, Agent, or Firm* — Leason Ellis LLP

(57) ABSTRACT

The present disclosure is directed to a method of manufacture of CHA framework crystalline materials of silica and a framework metal oxide. This is accomplished by using an improved sol-gel formulation including a water-soluble fraction of ODSO as an additional component. The resulting products include CHA framework crystalline materials of silica and a framework metal oxide, whereby a framework metal oxide can be an oxide of Al, Fe, B or Ga, and yields can be increased relative to comparable sol-gel formulations without ODSO.

18 Claims, 7 Drawing Sheets

(56) References Cited

U.S. PATENT DOCUMENTS

| | | | |
|---|---|---|---|
| 11,103,857 B2 | 8/2021 | Pacheco et al. |
| 11,111,212 B2 | 9/2021 | Koseoglu et al. |
| 11,124,713 B2 | 9/2021 | Koseoglu et al. |
| 11,247,911 B2 | 2/2022 | Muraza et al. |

FOREIGN PATENT DOCUMENTS

| | | | | |
|---|---|---|---|---|
| CN | 103055933 A | | 4/2013 | |
| CN | 106145134 A | | 11/2016 | |
| CN | 107982540 A | | 5/2018 | |
| CN | 111960434 A | | 11/2020 | |
| CN | 113996333 A | | 2/2022 | |
| CN | 114044524 A | | 2/2022 | |
| CN | 114057208 A | | 2/2022 | |
| EP | 0999183 B1 | | 6/2003 | |
| EP | 3743381 A1 | | 8/2019 | |
| JP | 2017014100 A | | 1/2017 | |
| JP | 2019099391 A | | 6/2019 | |
| JP | 2021155265 A | | 10/2021 | |
| WO | WO-2012145323 A1 | * | 10/2012 | .............. B01J 35/50 |
| WO | 2018202468 A1 | | 11/2018 | |

OTHER PUBLICATIONS

Zheng et al. "Preparation of steam-stable high-silica CHA (SSZ-13) membranes for CO2/CH4 and C2H4/C2H6 separation", Journal of Membrane Science 2015, 475, pp. 303-310) (Year: 2015). [8 pages].

Notice of Allowance of U.S. Appl. No. 18/152,484, mailed Apr. 29, 2025. [9 pages].

Grabicka et al. "Microwave-assisted synthesis of periodic mesoporous organosilicas with ethane and disulfide groups." Microporous and mesoporous materials 119.1-3 (2009): 144-149.

Jin et al. "Gold nanoparticles stabilized in a novel periodic mesoporous organosilica of SBA-15 for styrene epoxidation." Microporous and mesoporous materials 111.1-3 (2008): 569-576.

Jo et al. "Synthesis of Silicate Zeolite Analogues Using Organic Sulfonium Compounds as Structure-Directing Agents." Angewandte Chemie International Edition 54.43 (2015). Wiley Online Library, 12996-12999. 14 total pages.

* cited by examiner

METHOD FOR MANUFACTURE OF CRYSTALLINE MATERIAL HAVING A CHA FRAMEWORK IN THE PRESENCE OF ODSO

FIELD OF THE DISCLOSURE

The present invention relates to methods of making CHA framework crystalline materials.

BACKGROUND OF THE DISCLOSURE

Zeolites are crystalline solids possessing well-defined structures and uniform pore sizes that can be measured in angstroms (Å). Typically, zeolites comprise framework atoms such as silicon, aluminum and oxygen arranged as silica and alumina tetrahedra. Zeolites are generally hydrated silicates or aluminum silicates that can be made or selected with a controlled porosity and other characteristics, and typically contain cations, water and/or other molecules located in the porous network. In addition, aluminosilicates can be modified aluminosilicates including Fe, B or Ga in the framework.

Hundreds of natural and synthetic zeolite framework types exist with a wide range of applications. Numerous zeolites occur naturally and are extensively mined, whereas a wealth of interdependent research has resulted in an abundance of synthetic zeolites of different structures and compositions. The unique properties of zeolites and the ability to tailor zeolites for specific applications has resulted in the extensive use of zeolites in industry as catalysts, molecular sieves, adsorbents, ion exchange materials and for the separation of gases. Certain types of zeolites find application in various processes in petroleum refineries and many other applications. The zeolite pores can form sites for catalytic reactions, and can also form channels that are selective for the passage of certain compounds and/or isomers to the exclusion of others. Zeolites can also possess an acidity level that enhances its efficacy as a catalytic material or adsorbent, alone or with the addition of active components.

Synthetic chabazite zeolites are designated as having a CHA topological type framework by the International Zeolite Association, and are typically formed by 8-member rings for instance having a micropore size when viewed normal to the [001] direction of 3.8×3.8 Å. CHA zeolites are well known materials effective as catalysts for treating combustion exhaust gases in industrial applications including internal combustion engines, gas turbines, coal-fired power plants, and the like. In one example, nitrogen oxides ($NO_x$) in the exhaust gases may be controlled through a selective catalytic reduction process whereby $NO_x$ compounds in the exhaust gases are contacted with a reducing agent in the presence of a CHA zeolite catalyst.

Synthetic zeolites of the CHA topological type, when prepared as aluminosilicate compositions, are typically produced using structure directing agents (SDAs), also referred to as a "templates" or "templating agents". The SDAs that are used in the preparation of aluminosilicate CHA topological type materials are typically complex organic molecules which guide or direct the molecular shape and pattern of the zeolite's framework. Generally, the SDA can be considered as a mold around which the zeolite crystals form. After the crystals are formed, the SDA is removed from the interior structure of the crystals, leaving a molecularly porous aluminosilicate cage.

In typical synthesis techniques, solid zeolite crystals precipitate from a reaction mixture which contains the framework reactants (e.g., a source of silicon and a source of aluminum), a source of hydroxide ions (e.g., NaOH), and an SDA. Such synthesis techniques usually take from several hours to several days (depending on factors such as crystallization temperature) to achieve the desired crystallization. When crystallization is complete, the solid precipitate containing the zeolite crystals is separated from the mother liquor.

Within a typical refinery, there are by-product streams that must be treated or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of the MEROX process, in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell, which is somewhat less prevalent because of its relatively lower vapor pressure at ambient temperature; however, problems exist in the handling of this oil.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, preferably in the presence of a catalyst. The oxidation reaction products constitute an abundant source of ODSO compounds, sulfoxides, sulfonates, sulfinates and sulfones.

The ODSO stream so-produced contains ODSO compounds as disclosed in U.S. Pat. Nos. 10,781,168 and 11,111,212 as compositions (such as a solvent), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

Despite the known ways to produce chabazite zeolites of the CHA topological type, there remains a need in the art for improved methods to produce zeolite materials, in particular using DSO by-products in an economically and environmentally friendly manner. It is in regard to these and other problems in the art that the present disclosure is directed to provide a technical solution for an effective method of manufacturing zeolites of the CHA topological type.

SUMMARY OF THE DISCLOSURE

A method for the synthesis of CHA framework crystalline material of silica and a framework metal oxide is provided. The method comprises: forming a homogeneous aqueous mixture of a silica source, a framework metal oxide source selected from compounds of Al, Fe, B and Ga, an alkali metal source, an optional structure directing agent, water and an effective amount of water-soluble oxidized disulfide oil (ODSO); and heating the homogeneous aqueous mixture under conditions and for a time effective to form a precipitate suspended in a supernatant as an intermediate suspension, wherein the precipitate comprises CHA framework crystalline material.

In certain embodiments, the CHA framework crystalline material comprises at least about 0.1 mass % of the precipitate.

In certain embodiments, wherein the CHA framework crystalline material has the general formula $SiO_2$:$nY_2O_3$, where Y=Al, Fe, B or Ga and n=0.002-0.1, 0.002-0.2, 0.004-0.1 or 0.002-0.1. In some embodiments Y=Al and the CHA framework crystalline material is chabazite zeolite, for example having a silica-to-alumina molar ratio in the range of about 5-100, 5-50, 10-100, 10-50, 20-100, 20-50, 30-50 or 30-40.

In certain embodiments, the recovered crystalline material is calcined at a suitable temperature, temperature ramp rate and for a suitable period of time to realize porous crystalline material.

In certain embodiments, wherein the alkali metal source is a mineralizer selected from the group consisting of NaOH, KOH, RbOH, LiOH, CsOH and combinations comprising two or more of the foregoing mineralizers.

In certain embodiments, the framework metal oxide is alumina, and wherein the alkali metal source is sodium and the mass ratio of ODSO to sodium from the alkali source is in the range of about 0.1-7.5, 0.1-5.5, 0.6-7.5, 0.6-5.5, 1.3-7.5, 1.3-5.5, 2.0-7.5 or 2.0-5.5.

In certain embodiments of the method to synthesize crystalline material having a CHA: a cumulative amount of ODSO and water is approximately equivalent to an amount of water that is effective to produce CHA framework crystalline material in the absence of ODSO; the cumulative amount of ODSO and water, an amount of the silica source, an amount of the framework metal oxide source, an amount of the alkali metal source, and an amount of the optional structure directing agent are provided at an ODSO-enhanced compositional ratio; the ODSO-enhanced compositional ratio is approximately equivalent to a baseline compositional ratio of water, silica source, framework metal oxide source, alkali metal source and optional structure directing agent, the baseline compositional ratio being effective to produce CHA framework crystalline material in the absence of ODSO; and the conditions and time of heating are approximately equivalent to those that are effective to produce CHA framework crystalline material in the absence of ODSO.

In certain embodiments of the method to synthesize crystalline material having a CHA: a cumulative amount of ODSO and water is approximately equivalent to an amount of water that is effective to produce amorphous silica or amorphous silica-alumina in the absence of ODSO; the cumulative amount of ODSO and water, an amount of the silica source, an amount of the framework metal oxide source, an amount of the alkali metal source, and an amount of the optional structure directing agent are provided at an ODSO-enhanced compositional ratio; the ODSO-enhanced compositional ratio is approximately equivalent to a baseline compositional ratio of water, silica source, framework metal oxide source, alkali metal source and optional structure directing agent, the baseline compositional ratio being effective to produce amorphous silica or amorphous silica-alumina in the absence of ODSO; and the conditions and time of heating are approximately equivalent to those that are effective to produce amorphous silica or amorphous silica-alumina in the absence of ODSO.

In certain embodiments, yield of chabazite zeolite is greater using the ODSO-enhanced compositional ratio as compared with the baseline compositional ratio in the absence of ODSO, for example wherein the yield increase is in the range of 1-50, 1-30, 1-20, 5-50, 5-30 or 5-20 W %.

In certain embodiments, the framework metal oxide is alumina and the framework metal oxide source is selected from the group consisting of aluminates, alumina, other zeolites, aluminum colloids, boehmites, pseudo-boehmites, aluminum hydroxides, aluminum salts, aluminum alkoxides, aluminum wire and alumina gels. In certain embodiments, the framework metal oxide is ferric oxide (iron (III) oxide) and the framework metal oxide source is an iron (III) salt selected from the group consisting of iron (III) nitrate, iron (III) chloride and iron (III) sulfate. In certain embodiments, the framework metal oxide is boron trioxide and the framework metal oxide source is selected from the group consisting of one or more of borosilicate glasses, reactive borates including sodium tetraborate, borate esters, boron acids including boric acid, and alkali borates. In certain embodiments, the framework metal oxide is gallium (III) oxide and the framework metal oxide source is one or more gallium (III) salts selected from the group consisting of gallium (III) nitrate and gallium (III) chloride.

In certain embodiments, the silica source is selected from the group consisting of sodium silicate (water glass), rice husk, fumed silica, precipitated silica, colloidal silica, silica gels, zeolites, dealuminated zeolites, silicon hydroxides and silicon alkoxides.

In certain embodiments, the structure directing agent is used to stabilize the structure of the CHA framework crystalline material. In certain embodiments, the structure directing agent includes one or more compounds selected from the group consisting of quaternary ammonium ions, adamantamine derivatives including N,N,N-trimethyl-1-adamantammonium, quinuclidinol derivatives including N-methyl-3-quinuclidinol, cyclohexyl derivatives, and cyclohexylmethyl derivatives including trimethyl(cyclohexylmethyl)ammonium.

In certain embodiments, crystallization occurs in the absence of a seed. In certain embodiments, crystallization occurs in the presence of a seed, for example wherein the seed is selected from the group consisting of chabazite zeolite and faujasite zeolite.

In certain embodiments, a pH of the homogeneous aqueous mixture is greater than or equal to about 9, for example in the range of about 9-14, 9-13, 10-14, 10-13, 11-14 or 11-13. In certain embodiments: the homogeneous aqueous mixture is (optionally) aged before being subjected to heating for a period of about 0-48, 0-24, 0-5, 0.5-48, 0.5-24 or 0.5-5 hours; the homogeneous aqueous mixture is heated at a temperature in the range of about 120-190, 120-180, 145-190 or 145-180° C.; the homogeneous aqueous mixture is heated at autogenous pressure or a pressure in the range of atmospheric to 17 bar; and the homogeneous aqueous mixture is heated for a time period within the range of about 0.5-6, 0.7-6, 1-6, 0.5-4, 0.7-4 or 1-4 days.

In certain embodiments, the ODSO is derived from oxidation of disulfide oil compounds present in an effluent refinery hydrocarbon stream recovered following catalytic oxidation of mercaptans present in a mercaptan-containing hydrocarbon stream. In certain embodiments, the one or more ODSO compounds comprise ODSO compounds having 3 or more oxygen atoms. In certain embodiments, one or more ODSO compounds comprise ODSO compounds having 1 to 20 carbon atoms. In certain embodiments, the one or more ODSO compounds are in a mixture having an average density greater than about 1.0 g/cc. In certain embodiments, the one or more ODSO compounds are in a mixture having an average boiling point greater than about 80° C. In certain embodiments, the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are the same or different C1-C10 alkyl or C6-C10 aryl groups. In certain embodiments, the ODSO compounds have 3 or more oxygen atoms and include two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR), wherein R and R' are the same or different C1-C10 alkyl or C6-C10 aryl groups. In certain embodiments, the ODSO compounds have 3 or more oxygen atoms and include one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are the same or different C1-C10 alkyl or C6-C10 aryl groups. In certain embodiments, the ODSO compounds have 3 or more oxygen atoms and include two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), wherein R and R' are the same or different C1-C10 alkyl or C6-C10 aryl groups.

In certain embodiments, a zeolite comprising CHA type framework is provided. The CHA type framework zeolite has a characteristic X-ray powder diffraction pattern before calcination for removal of a structure directing agent, trimethyladamantylammonium cations, containing at least following diffraction peaks (in degrees 2 theta (+/−0.2) having relative intensities shown in parenthesis) at: 9.64 (VS), 16.29 (S), 20.96 (S), 25.10 (M) and 31.12 (M). The relative intensity is based on a strongest line in the X-ray pattern which is assigned a value of 100 and (W) [weak] is less than 20; (M) [medium] is between 20 and 50; (S) [strong] is between 50 and 80; and (VS) [very strong) is between 80 and 100]. In certain embodiments, the zeolite has a characteristic X-ray diffraction data after calcination removal of the structure directing agent containing at least following peaks (in degrees 2 theta (+/−0.2) having relative intensities shown in parenthesis) at: 9.60 (VS), 13.02 (M), 20.84 (M), 25.24 (W) and 30.98 (W).

Any combinations of the various embodiments and implementations disclosed herein can be used. These and other aspects and features can be appreciated from the following description of certain embodiments and the accompanying drawings and claims.

DETAILED DESCRIPTION OF CERTAIN EMBODIMENTS OF THE DISCLOSURE

Figure 2:
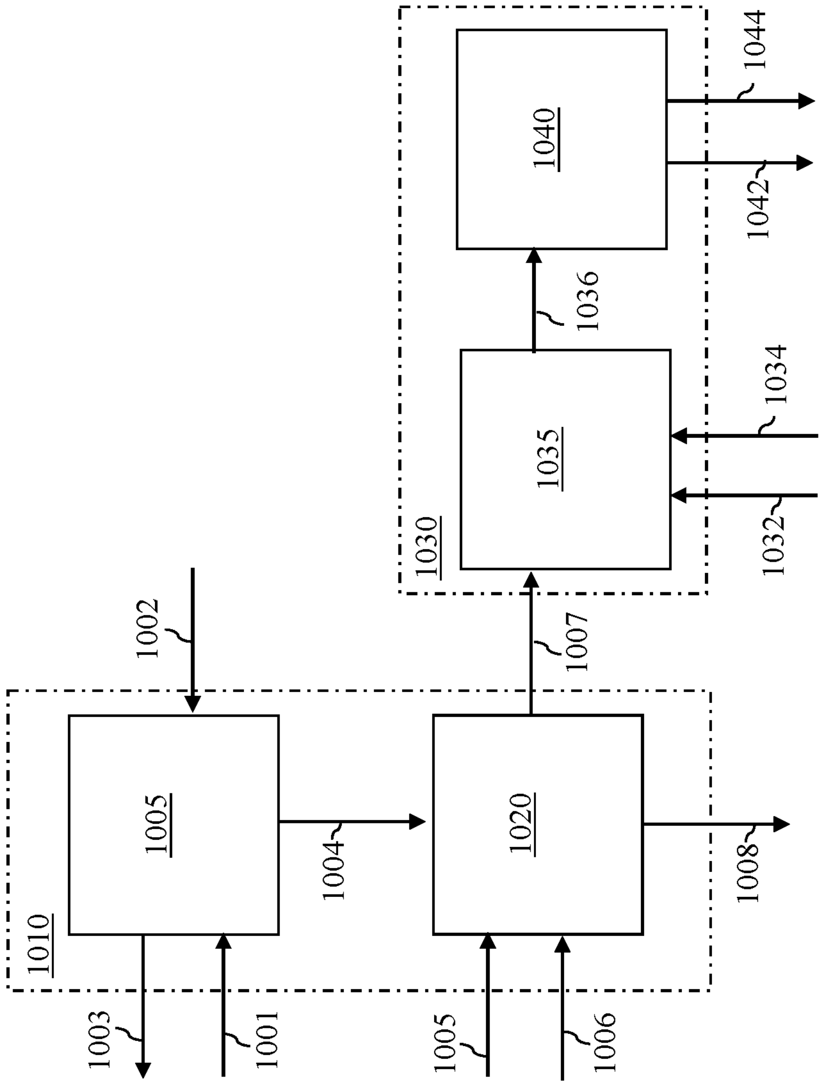
FIG. 2 is a simplified schematic diagram of a generalized version of an enhanced mercaptan oxidation or E-MEROX process.

The present disclosure is directed to a method of manufacture of CHA framework crystalline materials of silica and a framework metal oxide. This is accomplished by using an improved sol-gel formulation including a water-soluble fraction of ODSO as an additional component. The resulting products include CHA framework crystalline materials of silica and a framework metal oxide, whereby a framework metal oxide can be an oxide of Al, Fe, B or Ga. In certain embodiments the CHA framework crystalline materials include chabazite zeolite, having a micropore size related to the 8-member ring when viewed normal to the [001] direction of 3.8×3.8 Å. In certain embodiments yields are increased relative to comparable sol-gel formulations without ODSO as a precursor.

In conventional synthesis of CHA framework crystalline materials, water is used as an aqueous medium and as a solvent. In the embodiments of the present disclosure, an effective amount of water-soluble ODSO compounds is added within a homogeneous aqueous mixture. In certain embodiments, the ODSO is derived from a sulfur-containing refinery waste stream of disulfide oil and is used as a component for the synthesis of CHA framework crystalline materials.

In certain embodiments the overall crystalline material yield is increased using ODSO precursors as an additional component compared with an approximately equivalent water-only synthesis for CHA framework crystalline materials. In certain embodiments, compared with an approximately equivalent water-only synthesis for CHA framework crystalline materials, the use of ODSO compounds in the syntheses herein increases the overall crystalline material yield by about 1-50, 1-30, 1-20, 5-50, 5-30 or 5-20 mass %.

Methods for the preparation of CHA framework aluminosilicates such as chabazite zeolites are provided. Effective amounts and proportions of precursors and reagents are formed as a homogeneous aqueous mixture, including a water source, a framework metal oxide source, a silica source, an optional structure directing agent and an alkali metal source. In the place of a certain amount of water, an effective amount of water-soluble ODSO is used as an additional component. The components are mixed for an effective time and under conditions suitable to form the homogeneous aqueous mixture. The chronological sequence of mixing can vary, with the objective being a highly homogenous distribution of the components in an aqueous mixture. The homogeneous aqueous mixture is heated under conditions and for a time effective to form a precipitate (product) suspended in a supernatant (mother liquor). The precipitate is recovered, for example by filtration, washing and drying, as CHA framework aluminosilicates. In embodiments in which structure directing agent is used, calcination is carried out to render the material porous.

An effective amount of water for the aqueous environment and as a solvent during the sol-gel process can be provided from one or more water sources, including utility water that is added to form the homogeneous aqueous mixture, a water-containing silica source such as colloidal silica, an aqueous framework metal oxide source, an aqueous alkali metal source and/or an aqueous structure directing agent in embodiments when used. These mixture components are added with water to the reaction vessel prior to heating. Typically, water allows for adequate mixing to realize a more homogeneous distribution of the sol-gel components, which ultimately produces a more desirable product because each crystal is more closely matched in properties to the next crystal. Insufficient mixing could result in undesirable "pockets" of highly concentrated sol-gel components and this may lead to impurities in the form of different structural phases or morphologies. Water also determines the yield per volume. In the descriptions that follow, it is understood that water is a component of homogeneous aqueous mixtures from one or more of the sources of water.

In certain embodiments, a homogeneous aqueous mixture is formed by: providing a framework metal oxide source; combining a silica source and an alkali metal source and an optional structure directing agent; and combining an effective amount of water-soluble ODSO. Alternatively, the water-soluble ODSO is combined with the silica source, the optional structure directing agent and the alkali metal source, and that mixture is combined with the framework metal oxide source.

In certain embodiments, a homogeneous aqueous mixture is formed by: providing a framework metal oxide source and an alkali metal source as a mixture; combining a silica source and an optional structure directing agent; and combining an effective amount of water-soluble ODSO. Alternatively, the water-soluble ODSO is combined with the silica source and optional structure directing agent, and that mixture is combined with the framework metal oxide source and the alkali metal source.

In certain embodiments, a homogeneous aqueous mixture is formed by: combining an effective amount of water-soluble ODSO with a framework metal oxide source to form a mixture; and that mixture is combined with a silica source, an alkali metal source and an optional structure directing agent.

In certain embodiments, a homogeneous aqueous mixture is formed by: combining an effective amount of the water-soluble ODSO with a framework metal oxide source, the alkali metal source and an optional structure directing agent to form a mixture; and that mixture is combined with the silica source.

A homogeneous aqueous mixture of the framework metal oxide source, silica source, alkali source, an optional structure directing agent and ODSO is formed from any of the above chronological sequences of component addition. The homogeneous aqueous mixture is heated under conditions and for a time effective to form a precipitate suspended in a supernatant, wherein the time and conditions are effective to realize CHA framework crystalline material as the precipitate, which is recovered, for example by filtration, washing and drying. In certain embodiments in which a structure directing agent is used, the recovered precipitate is calcined at a suitable temperature, temperature ramp rate and for a suitable period of time to render the material porous.

It is to be appreciated by those skilled in the art that in certain embodiments effective baseline compositional ratios for synthesis of CHA framework crystalline material can be determined by empirical data, for instance summarized as phase boundary diagrams or other methodologies as is known in material synthesis.

In certain embodiments, effective ratios of precursors and reagents for production of CHA framework crystalline material are within those that are known to produce such zeolites and can be determined by those of ordinary skill in the art. For example, for aluminosilicates effective amounts of silica and alumina precursors (as the framework metal oxide) are provided to produce CHA framework aluminosilicates having a silica-to-alumina ratio (SAR) in the range of about 5-100, 5-50, 10-100, 10-50, 20-100, 20-50, 30-50 or 30-40. In certain embodiments, ratios of materials effective to synthesize CHA framework aluminosilicates as disclosed herein are similar to those used in typical synthesis of CHA framework aluminosilicates in the absence of ODSO. In certain embodiments, baseline compositional ratios of the aqueous composition used to produce zeolites herein include (on a molar basis):

$SiO_2/Al_2O_3$: 10-100

$OH^-/SiO_2$: 0.05-1.0

$R/SiO_2$: 0-0.5

Alkali metal cation/$SiO_2$: 0.1-1.0

$H_2O/SiO_2$: 5-80 wherein R is the structure directing agent, and a level of 0 represents absence of the structure directing agent.

It is appreciated by those skilled in the art that these molar composition ratios can be expressed on a mass basis. In certain examples herein baseline compositional ratio effective to produce CHA framework zeolite, in particular, SSZ-13 chabazite zeolite on a molar basis is approximately 1 $Al_2O_3$: 40 $SiO_2$: 4 $Na_2O$: 8 SDA: 1760.

In the embodiments herein, ratios of components in homogeneous aqueous mixtures including ODSO are referred to as "ODSO-enhanced compositional ratios." In certain embodiments an ODSO-enhanced compositional ratio is one in which ODSO is included to replace an approximately equivalent mass of water in the homogeneous aqueous mixture, and wherein a cumulative mass of ODSO and water (ODSO+$H_2O$) is approximately equivalent to a mass of water that is effective to produce CHA framework crystalline material, including chabazite zeolite such as SSZ-13, in the absence of ODSO. In certain embodiments: a baseline compositional ratio of silica, aluminum, alkali metal, an optional structure directing agent and water is known or determined to be effective to produce CHA framework crystalline material in the absence of ODSO; an ODSO-enhanced compositional ratio is approximately equivalent to the baseline compositional ratio except for the substitution of ODSO for water on a mass basis; and wherein the conditions and time of heating the ODSO-enhanced sol-gel is approximately equivalent to those that are effective to produce the CHA framework crystalline material in the absence of ODSO.

The silica source can comprise, without limitation, one or more of silicates including sodium silicate (water glass), rice husk, fumed silica, precipitated silica, colloidal silica, silica gels, other zeolites, dealuminated zeolites, and silicon hydroxides and alkoxides. Silica sources resulting in a high relative yield are preferred. For instance, suitable materials as silica sources include fumed silica commercially available from Cabotand colloidal silica (LUDOX commercially available from Cabot).

In embodiments in which the framework metal oxide is an oxide of aluminum, a suitable source can comprise, without limitation, one or more of aluminates, alumina, other zeolites, aluminum colloids, boehmites, pseudo-boehmites, aluminum salts such as aluminum nitrate, aluminum sulfate and alumina chloride, aluminum hydroxides and alkoxides, aluminum wire and alumina gels. For example, suitable materials as alumina sources include commercially available materials including for instance high purity aluminas (CERALOX commercially available from Sasol) and alumina hydrates (PURAL and CAPITAL commercially available from Sasol), boehmites (DISPERSAL and DISPAL commercially available from Sasol), and silica-alumina hydrates (SIRAL commercially available from Sasol) and the corresponding oxides (SIRALOX commercially available from Sasol).

In embodiments in which the framework metal oxide is an oxide of iron, such as ferric oxide (iron (III) oxide), a suitable source can comprise one or more iron (III) salts, for example and without limitation, iron (III) nitrate, iron (III) chloride, or iron (III) sulfate.

In embodiments in which the framework metal oxide is an oxide of boron, such as boron trioxide, a suitable source can comprise, without limitation, one or more of borosilicate glasses, reactive borates such as sodium tetraborate, borate esters, boron acids such as boric acid, or alkali borates.

In embodiments in which the framework metal oxide is an oxide of gallium, such as gallium (III) oxide, a suitable source can comprise one or more gallium (III) salts, for example and without limitation, gallium (III) nitrate or gallium (III) chloride.

In embodiments in which structure directing agents are used, they are selected to influence the target type of zeolite structure to be formed. Effective structure directing agents that can optionally be added include known or developed structure directing agents include one or more of quaternary ammonium ions, adamantamine derivatives such as N,N,N-trimethyl-1-adamantammonium, quinuclidinol derivatives such as N-methyl-3-quinuclidinol, cyclohexyl derivatives, or cyclohexylmethyl derivatives such as trimethyl(cyclohexylmethyl)ammonium. Commonly owned and co-pending U.S. application Ser. No. 18/152,484 filed Jan. 10, 2023, entitled "Method to Lower Structure Directing Agent Content Requirement for Manufacture of CHA Framework Crystalline Material" which is incorporated by reference herein in its entirety discloses processes for synthesizing CHA framework aluminosilicates using reduced amounts of structure directing agent.

The disclosed process for synthesizing CHA framework aluminosilicates can occur in the absence or presence of seed materials comprising zeolite structures such as chabazite zeolite and faujasite zeolite. Functions of the seeds can include, but are not limited to: supporting growth on the surface of the seed, that is, where crystallization does not undergo nucleation but rather crystal growth is directly on the surface of the seed; the parent gel and seed share common larger composite building units; the parent gel and seed share common smaller units, for instance 4 member rings; seeds that undergo partial dissolution to provide a surface for crystal growth of a zeolite; crystallization occurs through a "core-shell" mechanism with the seed acting as a core and the target material grows on the surface; and/or where the seeds partially dissolve providing essential building units that can orientate zeolite crystallization.

A hydroxide mineralizer is included as the hydroxide derived from the alkali metal source from the Periodic Table IUPAC Group 1 alkaline metals (and/or from the hydroxide of any hydroxide-containing structure directing agent). For example, these are selected from the group consisting of NaOH, KOH, RbOH, LiOH, CsOH and combinations thereof. In certain embodiments a Na-based hydroxide mineralizer is selected. Note that the alkali metal source is provide as a hydroxide, but in embodiments herein where the ratio is expressed based on the mass of the alkali, it is the metal itself. For instance, when the alkali is NaOH, the ODSO/Na ratio is determined by dividing the mass of the ODSO by the mass of the Na portion of NaOH, that is, about 57.5% of the NaOH mass. In certain embodiments the amount of ODSO can be expressed as a ratio (molar or mass) based on the total Na content, for example from an alkali source and another source such as an alumina source or other framework metal oxide source. In the disclosure herein the ODSO/Na ratio is expressed based on the total Na content unless otherwise stated. In certain embodiments the amount of ODSO can be expressed as a ratio (molar or mass) based on Na from an alkali source excluding Na content from a framework metal oxide source. In certain embodiments the amount of ODSO can be expressed as a ratio (molar or mass) relative to the hydroxide content from a mineralizer and/or from another source such as a structure directing agent. In certain embodiments the basic components from the hydroxide mineralizer source are provided in effective amounts so as to maintain the homogeneous mixture at a pH level of greater than or equal to about 9, for example in the range of about 9-14, 9-13, 10-14, 10-13, 11-14 or 11-13. It is appreciated that the overall pH is influenced by anions from the hydroxide mineralizer source, and in certain embodiments anions from other sources such as from an alumina source or other framework metal oxide source, a silica source and/or an optional structure directing agent. In certain embodiments hydroxide anions are provided as the mineralizer from an alkali metal source and a structure directing agent. In the process herein, the pH is reduced by the presence of ODSO, therefore, the quantity of the basic compound from one or more of the aforementioned sources can be adjusted accordingly to attain the requisite pH.

The mixing steps typically occur at ambient temperature and pressure (for instance about 20° C. and about 1 standard atmosphere), for a mixing time that is sufficient to realize a homogeneous distribution of the components. In certain embodiments the sol-gel can be aged before being subjected to subsequent hydrothermal treatment, for example for a period of about 0-48, 0-24, 0-5, 0.5-48, 0.5-24 or 0.5-5 hours. Hydrothermal treatment is then carried out at a temperature in the range of about 120-190, 120-180, 145-

190 or 145-180° C. and at a pressure in the range of atmospheric to 17 bar or autogenous pressure (from the sol-gel or from the sol-gel plus an addition of a gas purge into the vessel prior to heating), and for a time period within the range of about 0.5-6, 0.7-6, 1-6, 0.5-4, 0.7-4 or 1-4 days, to ensure crystallization and formation of a zeolite gel.

The products are washed, for example with water at a suitable quantity, for example at about twice the volume of the sol-gel solution. The wash can be at a temperature of from about 20-80° C., at atmospheric, vacuum or under pressure. The wash can continue until the pH of the filtrate approaches about 7-9. The solids are recovered by filtration, for instance, using known techniques such as centrifugation, gravity, vacuum filtration, filter press, or rotary drums, and dried, for example at a temperature of up to about 110 or 150° C.

In certain optional embodiments, if the as-made CHA framework crystalline material is calcined, for instance for removal of structure directing agent from pores of the CHA framework crystalline material, conditions for calcination can include temperatures in the range of about 450-700, 450-600, 500-700 or 500-600° C., atmospheric pressure, and a time period of about 3-24, 3-18, 6-24 or 6-18 hours. Calcining can occur with ramp rates in the range of from about 0.1-10, 0.1-5, 0.1-3, 1-10, 1-5 or 1-3° C. per minute. In certain embodiments calcination can have a first step ramping to a temperature of between about 100-150° C. with a holding time of from about 2-24 hours (at ramp rates of from about 0.1-5, 0.1-3, 1-5 or 1-3° C. per min) before increasing to a higher temperature with a final holding time in the range of about 2-24 hours.

Example embodiments of the present disclosure are directed to one or more ODSO compounds that are used as additional components in a homogeneous aqueous mixture for zeolite synthesis. The additional components can be a mixture that comprises two or more ODSO compounds. In the description herein, the terms "oxidized disulfide oil", "ODSO", "ODSO mixture" and "ODSO compound(s)" may be used interchangeably for convenience. As used herein, the abbreviations of oxidized disulfide oils ("ODSO") and disulfide oils ("DSO") will be understood to refer to the singular and plural forms, which may also appear as "DSO compounds" and "ODSO compounds," and each form may be used interchangeably. In certain instances, a singular ODSO compound may also be referenced.

In the process herein, an effective amount of one or more ODSO compounds are used in the synthesis of CHA framework aluminosilicates. In certain embodiments an effective amount can be based on an amount that attains a desired pH range. In certain embodiments an effective amount can be approximately equivalent to a reduction in the amount of water that is used in the homogeneous aqueous mixture compared to synthesis without ODSO. In certain embodiments an effective amount can be based on a ratio of ODSO to alkali metal. In certain embodiments a ratio of ODSO to alkali metal represents the amount of ODSO relative to the amount of the selected alkali metal on a mass/mass basis or a molar/molar basis. For example, if sodium is used the ratio is expressed as ODSO/Na on a mass/mass basis or a molar/molar basis. In certain embodiments, the effective amount of ODSO is that which results in a pH level of greater than or equal to about 9, for example in the range of about 9-14, 9-13, 10-15, 10-14, 10-13, 11-14 or 11-13 in the homogeneous aqueous mixture. In certain embodiments, the effective amount of ODSO can be relative to the quantity of basic groups in the homogeneous aqueous mixture, such as OH—, to attain a desired pH range, with basic group contributions from the mineralizer; such a ratio can be expressed on a molar basis or on a mass basis. In certain embodiments, a ratio of ODSO to basic groups can exclude basic groups from a structure directing agent. In certain embodiments, a ratio of ODSO to basic groups can include basic groups from a structure directing agent. In certain embodiments, the effective amount of ODSO is that which results in a product that is at least about 0.1 mass % of CHA framework aluminosilicates. In certain embodiments, amorphous alumina or silica alumina is produced as a co-product, and the effective amount of ODSO is less than that which produces 100 mass % amorphous alumina or silica alumina.

For instance, in the examples provided herein using the selected materials and ratios of silica, alumina, alkali metal and structure directing agent, and under the recited conditions, CHA framework aluminosilicate is produced when the ODSO/Na ratio is about 2.22, 3.71, 4.74 and 6.68 (based on total Na content, including Na contribution from the alkali source and the alumina source), and amorphous alumina or silica alumina is produced when the ODSO/Na ratio is about 8.15. In certain embodiments, the effective amount of ODSO is that which results in the synthesis of CHA framework aluminosilicates is an ODSO/Na ratio (wt./wt.) is in the range of about 0.1-7.5, 0.1-5.5, 0.6-7.5, 0.6-5.5, 1.3-7.5, 1.3-5.5, 2.0-7.5 or 2.0-5.5. In certain embodiments, the effective amount of ODSO as expressed as ODSO/Na mass ratio ranges is based on a precursor ratio on a molar basis of approximately 1 $Al_2O_3$:40 $SiO_2$:4 $Na_2O$:8 SDA:1760 $H_2O$, which can be converted to a mass basis. In additional embodiments, the precursor ratio is ineffective to produce CHA framework aluminosilicate, for example, produces amorphous silica and/or silica alumina, and when an effective amount of ODSO is added, the phase boundary shifts to produce CHA framework aluminosilicate using approximately equivalent baseline compositional ratios and synthesis conditions.

In certain embodiments, the ODSO compounds used as the additional component used herein is derived from controlled catalytic oxidation of disulfide oils from mercaptan oxidation processes. The effluents from controlled catalytic oxidation of disulfide oils from mercaptan oxidation processes includes ODSO compounds and in certain embodiments DSO compounds that were unconverted in the oxidation process. In certain embodiments this effluent contains water-soluble compounds and water-insoluble compounds. The effluent contains at least one ODSO compound, or a mixture of two or more ODSO compounds, selected from the group consisting of compounds having the general formula (R—SO—S—R'), (R—SOO—S—R'), (R—SOO—SO—R'), (R—SOO—SOO—R'), (R—SO—SO—R'), (R—SO—SOO—OH), (R—SOO—SOO—OH), (R—SO—SO—OH), (R—SOO—SO—OH), (R'—SO—SO—OR), (R'—SOO—SO—OR), (R'—SO—SOO—OR) and (R'—SOO—SOO—OR). In certain embodiments, in the above formulae R and R' are the same or different C1-C10 alkyl or C6-C10 aryl groups. It will be understood that since the source of the DSO is a refinery feedstream, the R and R' substituents vary, e.g., methyl and ethyl subgroups, and the number of sulfur atoms, S, in the as-received feedstream to oxidation can extend to 3, for example, trisulfide compounds.

In certain embodiments the water-soluble compounds and water-insoluble compounds are separated from one another, and a component used herein for zeolite synthesis comprises all or a portion of the water-soluble compounds separated from the total effluents from oxidation of disulfide oils from mercaptan oxidation processes. For example, the different phases can be separated by decantation or partitioning with a separating funnel, separation drum, by decantation, or any other known apparatus or process for separating two immiscible phases from one another. In certain embodiments, the water-soluble and water-insoluble components can be separated by distillation as they have different boiling point ranges. It is understood that there will be crossover of the water-soluble and water-insoluble components in each fraction due to solubility of components, typically in the ppmw range (for instance, about 1-10,000, 1-1,000, 1-500 or 1-200 ppmw). In certain embodiments, contaminants from each phase can be removed, for example by stripping or adsorption.

In certain embodiments a component used herein for zeolite synthesis comprises, consists of or consists essentially of at least one water-soluble ODSO compound having 3 or more oxygen atoms that is selected from the group consisting of compounds having the general formula (R—SOO—SO—R'), (R—SOO—SOO—R'), (R—SO—SOO—OH), (R—SOO—SOO—OH), (R—SOO—SO—OH), ((R'—SO—SO—OR), (R'—SOO—SO—OR), (R'—SO—SOO—OR) and (R'—SOO—SOO—OR). In certain embodiments a component used herein for zeolite synthesis comprises, consists of or consists essentially of a mixture or two or more water-soluble ODSO compounds having 3 or more oxygen atoms, that is selected from the group consisting of compounds having the general formula (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR). In certain embodiments a component used herein for zeolite synthesis comprises, consists of or consists essentially of ODSO compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof. In certain embodiments, in the above formulae R and R' are the same or different C1-C10 alkyl or C6-C10 aryl groups. In certain embodiments, the R and R' are methyl and/or ethyl groups. In certain embodiments, the ODSO compound(s) used herein as a component for zeolite synthesis have 1 to 20 carbon atoms.

In certain embodiments, a component used herein for zeolite synthesis comprises, consists of or consists essentially of ODSO compounds having an average density greater than about 1.0 g/cc. In certain embodiments, a component used herein for zeolite synthesis comprises, consists of or consists essentially of ODSO compounds having an average boiling point greater than about 80° C. In certain embodiments, a component used herein for zeolite synthesis comprises, consists of or consists essentially of ODSO compounds having a dielectric constant that is less than or equal to 100 at 0° C.

Table 1 includes examples of polar water-soluble ODSO compounds that contain 3 or more oxygen atoms. In certain embodiments the identified ODSO compounds are obtained from a water-soluble fraction of the effluents from oxidation of DSO obtained from MEROX by-products. The ODSO compounds that contain 3 or more oxygen atoms are water-soluble over effectively all concentrations, for instance, with some minor amount of acceptable tolerance for carry over components from the effluent stream and in the water insoluble fraction with 2 oxygen atoms of no more than about 1, 3 or 5 mass percent.

In certain embodiments the ODSO compounds used as a component for zeolite synthesis comprise all or a portion of the ODSO compounds contained in an oxidation effluent stream that is obtained by controlled catalytic oxidation of MEROX process by-products, DSO compounds, as disclosed in U.S. Pat. Nos. 10,807,947 and 10,781,168 and as incorporated herein by reference above.

In some embodiments, the ODSO compounds used as a component for zeolite synthesis are derived from oxidized DSO compounds present in an effluent refinery hydrocarbon stream recovered following the catalytic oxidation of mercaptans present in the hydrocarbon stream. In some embodiments, the DSO compounds are oxidized in the presence of a catalyst. The effluent hydrocarbon stream recovered following the catalytic oxidation of DSO, derived from the catalytic oxidation of mercaptans present in a mercaptan-containing hydrocarbon stream, generally comprises a mixture of ODSO compounds described herein and sulfur compounds including sulfonic acids, for example, methane sulfonic acid, ethane sulfonic acid, or an alkyl sulfonic acid (the alkyl group being based on the R group of the DSO being oxidized).

As noted above, the designation "MEROX" originates from the function of the process itself, that is, the conversion of mercaptans by oxidation. The MEROX process in all of its applications is based on the ability of an organometallic catalyst in a basic environment, such as a caustic, to accelerate the oxidation of mercaptans to disulfides at near ambient temperatures and pressures. The overall reaction can be expressed as follows:

$$RSH + 1/4\,O_2 \rightarrow \tfrac{1}{4}\,RSSR + \tfrac{1}{2}\,H_2O \qquad (1)$$

where R is a hydrocarbon chain that may be straight, branched, or cyclic, and the chains can be saturated or unsaturated. In most petroleum fractions, there will be a mixture of mercaptans so that the R can have 1, 2, 3 and up to 10 or more carbon atoms in the chain. This variable chain length is indicated by R and R' in the reaction. The reaction is then written:

$$2\,R'SH + 2\,RSH\,O_2 \rightarrow 2\,R'SSR + 2\,H_2O \qquad (2)$$

This reaction occurs spontaneously whenever any sour mercaptan-bearing distillate is exposed to atmospheric oxygen, but proceeds at a very slow rate. In addition, the catalyzed reaction (1) set forth above requires the presence of an alkali caustic solution, such as aqueous sodium hydroxide. The mercaptan oxidation proceeds at an economically practical rate at moderate refinery downstream temperatures.

The MEROX process can be conducted on both liquid streams and on combined gaseous and liquid streams. In the case of liquid streams, the mercaptans are converted directly to disulfides which remain in the product so that there is no reduction in total sulfur content of the effluent stream. The MEROX process typically utilizes a fixed bed reactor system for liquid streams and is normally employed with charge stocks having end points above 135° C.-150° C. Mercaptans are converted to disulfides in the fixed bed reactor system over a catalyst, for example, an activated charcoal impregnated with the MEROX reagent, and wetted with caustic solution. Air is injected into the hydrocarbon feedstream ahead of the reactor and in passing through the catalyst-impregnated bed, the mercaptans in the feed are oxidized to disulfides. The disulfides are substantially insoluble in the caustic and remain in the hydrocarbon phase. Post treatment is required to remove undesirable by-products resulting from known side reactions such as the neutralization of $H_2S$, the oxidation of phenolic compounds, entrained caustic, and others.

The vapor pressures of disulfides are relatively low compared to those of mercaptans, so that their presence is much less objectionable from the standpoint of odor; however, they are not environmentally acceptable due to their sulfur content and their disposal can be problematical.

In the case of mixed gas and liquid streams, extraction is applied to both phases of the hydrocarbon streams. The degree of completeness of the mercaptan extraction depends upon the solubility of the mercaptans in the alkaline solution, which is a function of the molecular weight of the individual mercaptans, the extent of the branching of the mercaptan molecules, the concentration of the caustic soda and the temperature of the system. Thereafter, the resulting DSO compounds are separated and the caustic solution is regenerated by oxidation with air in the presence of the catalyst and reused.

Figure 1:
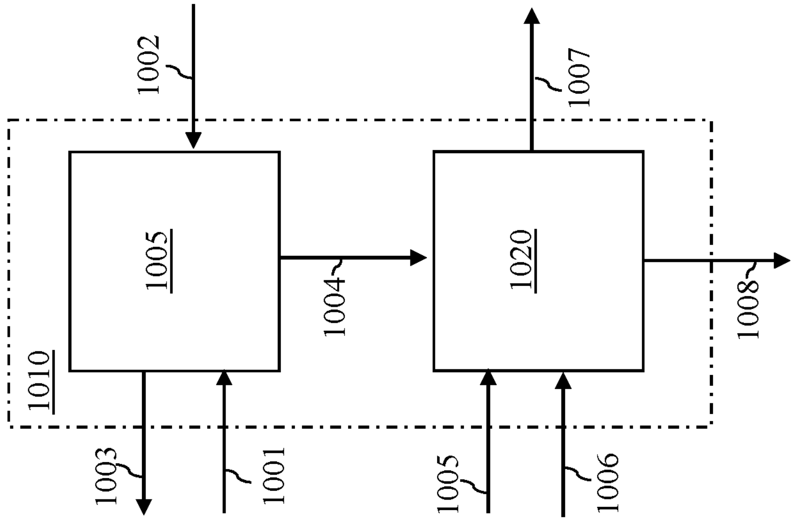
FIG. 1 is a simplified schematic diagram of a generalized version of a conventional mercaptan oxidation or MEROX process for the liquid-liquid extraction of a mercaptan containing hydrocarbon stream.

Referring to the attached drawings, FIG. 1 is a simplified schematic of a generalized version of a conventional MEROX process employing liquid-liquid extraction for removing sulfur compounds. A MEROX unit 1010, is provided for treating a mercaptan containing hydrocarbon stream 1001. In some embodiments, the mercaptan containing hydrocarbon stream 1001 is LPG, propane, butane, light naphtha, kerosene, jet fuel, or a mixture thereof. The process generally includes the steps of: introducing the hydrocarbon stream 1001 with a homogeneous catalyst into an extraction vessel 1005 containing a caustic solution 1002, in some embodiments, the catalyst is a homogeneous cobalt-based catalyst; passing the hydrocarbon catalyst stream in countercurrent flow through the extraction section of the extraction 1005 vessel in which the extraction section includes one or more liquid-liquid contacting extraction decks or trays (not shown) for the catalyzed reaction with the circulating caustic solution to convert the mercaptans to water-soluble alkali metal alkane thiolate compounds; withdrawing a hydrocarbon product stream 1003 that is free or substantially free of mercaptans from the extraction vessel 1005, for instance, having no more than about 1000, 100, 10 or 1 ppmw mercaptans; recovering a combined spent caustic and alkali metal alkane thiolate stream 1004 from the extraction vessel 1005; subjecting the spent caustic and alkali metal alkane thiolate stream 1004 to catalyzed wet air oxidation in a reactor 1020 into which is introduced catalyst 1005 and air 1006 to provide the regenerated spent caustic 1008 and convert the alkali metal alkane thiolate compounds to disulfide oils; and recovering a by-product stream 1007 of DSO compounds and a minor proportion of other sulfides such as mono-sulfides and tri-sulfides. The effluents of the wet air oxidation step in the MEROX process can comprise a minor proportion of sulfides and a major proportion of disulfide oils. As is known to those skilled in the art, the composition of this effluent stream depends on the effectiveness of the MEROX process, and sulfides are assumed to be carried-over material. A variety of catalysts have been developed for the commercial practice of the process. The efficiency of the MEROX process is also a function of the amount of $H_2S$ present in the stream. It is a common refinery practice to install a prewashing step for $H_2S$ removal.

An enhanced MEROX process ("E-MEROX") is a modified MEROX process where an additional step is added, in which DSO compounds are oxidized with an oxidant in the presence of a catalyst to produce a mixture of ODSO compounds. The by-product DSO compounds from the mercaptan oxidation process are oxidized, in some embodiments in the presence of a catalyst, and constitute an abundant source of ODSO compounds that are sulfoxides, sulfonates, sulfinates, sulfones and their corresponding disulfur mixtures. The disulfide oils having the general formula RSSR' (wherein R and R' can be the same or different and can have 1, 2, 3 and up to 10 or more carbon atoms) can be oxidized without a catalyst or in the presence of one or more catalysts to produce a mixture of ODSO compounds. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. If a catalyst is used in the oxidation of the disulfide oils having the general formula RSSR' to produce the ODSO compounds, it can be a heterogeneous or homogeneous oxidation catalyst. The oxidation catalyst can be selected from one or more heterogeneous or homogeneous catalyst comprising metals from the IUPAC Group 4-12 of the Periodic Table, including Ti, V, Mn, Co, Fe, Cr, Cu, Zn, W and Mo. The catalyst can be a homogeneous water-soluble compound that is a transition metal containing an active species selected from the group consisting of Mo (VI), W (VI), V (V), Ti (IV), and their combination. In certain embodiments, suitable homogeneous catalysts include molybdenum naphthenate, sodium tungstate, molybdenum hexacarbonyl, tungsten hexacarbonyl, sodium tungstate and vanadium pentoxide. An exemplary catalyst for the controlled catalytic oxidation of MEROX process by-products DSO is sodium tungstate, $Na_2WO_4 \cdot 2H_2O$. In certain embodiments, suitable heterogeneous catalysts include Ti, V, Mn, Co, Fe, Cr, W, Mo, and combinations thereof deposited on a support such as alumina, silica-alumina, silica, natural zeolites, synthetic zeolites, and combinations comprising one or more of the above supports.

The oxidation of DSO typically is carried out in an oxidation vessel selected from one or more of a fixed-bed reactor, an ebullated bed reactor, a slurry bed reactor, a moving bed reactor, a continuous stirred tank reactor, and a tubular reactor. The ODSO compounds produced in the E-MEROX process generally comprise two phases: a water-soluble phase and water-insoluble phase, and can be separated into the aqueous phase containing water-soluble ODSO compounds and a non-aqueous phase containing water-insoluble ODSO compounds. The E-MEROX process can be tuned depending on the desired ratio of water-soluble to water-insoluble compounds presented in the product ODSO mixture. Partial oxidation of DSO compounds results in a higher relative amount of water-insoluble ODSO compounds present in the ODSO product and a near or almost complete oxidation of DSO compounds results in a higher relative amount of water-soluble ODSO present in the ODSO product. Details of the ODSO compositions are discussed in the U.S. Pat. No. 10,781,168, which is incorporated herein by reference above.

FIG. 2 is a simplified schematic of an E-MEROX process that includes E-MEROX unit 1030. The MEROX unit 1010 unit operates similarly as in FIG. 1, with similar references numbers representing similar units/feeds. In FIG. 2, the effluent stream 1007 from the generalized MEROX unit of FIG. 1 is treated. It will be understood that the processing of the mercaptan containing hydrocarbon stream of FIG. 1 is illustrative only and that separate streams of the products, and combined or separate streams of other mixed and longer chain products can be the subject of the process for the recovery and oxidation of DSO to produce ODSO compounds, that is the E-MEROX process. In order to practice the E-MEROX process, apparatus are added to recover the by-product DSO compounds from the MEROX process. In addition, a suitable reactor 1035 add into which the DSO compounds are introduced in the presence of a catalyst 1032 and an oxidant 1034 and subjecting the DSO compounds to a catalytic oxidation step to produce the mixed stream 1036 of water and ODSO compounds. A separation vessel 1040 is provided to separate the by-product 1044 from the ODSO compounds 1042.

The oxidation to produce OSDO can be carried out in a suitable oxidation reaction vessel operating at a pressure in the range from about 1-30, 1-10 or 1-3 bars. The oxidation to produce OSDO can be carried out at a temperature in the range from about 20-300, 20-150, 20-90, 45-300, 15-150 or 45-90° C. The molar feed ratio of oxidizing agent-to-monosulfur can be in the range of from about 1:1 to 100:1, 1:1 to 30:1 or 1:1 to 4:1. The residence time in the reaction vessel can be in the range of from about 5-180, 5-90, 5-30, 15-180, 15-90 or 5-30 minutes. In certain embodiments, oxidation of DSO is carried out in an environment without added water as a reagent. The by-products stream 1044 generally comprises wastewater when hydrogen peroxide is used as the oxidant. Alternatively, when other organic peroxides are used as the oxidant, the by-products stream 1044 generally comprises the alcohol of the peroxide used. For example, if butyl peroxide is used as the oxidant, the by-product alcohol 1044 is butanol.

In certain embodiments water-soluble ODSO compounds are passed to a fractionation zone (not shown) for recovery following their separation from the wastewater fraction. The fractionation zone can include a distillation unit. In certain embodiments, the distillation unit can be a flash distillation unit with no theoretical plates in order to obtain distillation cuts with larger overlaps with each other or, alternatively, on other embodiments, the distillation unit can be a flash distillation unit with at least 15 theoretical plates in order to have effective separation between cuts. In certain embodiments, the distillation unit can operate at atmospheric pressure and at a temperature in the range of from 100° C. to 225° C. In other embodiments, the fractionation can be carried out continuously under vacuum conditions. In those embodiments, fractionation occurs at reduced pressures and at their respective boiling temperatures. For example, at 350 mbar and 10 mbar, the temperature ranges are from 80° C. to 194° C. and 11° C. to 98° C., respectively. Following fractionation, the wastewater is sent to the wastewater pool (not shown) for conventional treatment prior to its disposal. The wastewater by-product fraction can contain a small amount of water-insoluble ODSO compounds, for example, in the range of from 1 ppmw to 10,000 ppmw. The wastewater by-product fraction can contain a small amount of water-soluble ODSO compounds, for example, in the range of from 1 ppmw to 50,000 ppmw, or 100 ppmw to 50,000 ppmw. In embodiments where alcohol is the by-product alcohol, the alcohol can be recovered and sold as a commodity product or added to fuels like gasoline. The alcohol by-product fraction can contain a small amount of water-insoluble ODSO compounds, for example, in the range of from 1 ppmw to 10,000 ppmw. The alcohol by-product fraction can contain a small amount of water-soluble ODSO compounds, for example, in the range of from 100 ppmw to 50,000 ppmw.

EXAMPLES

The below examples and data are exemplary. It is to be understood that other ratios and types of framework metal oxide sources, silica sources, alkali metals and bases can be used as compared to the examples.

Figure 3A:
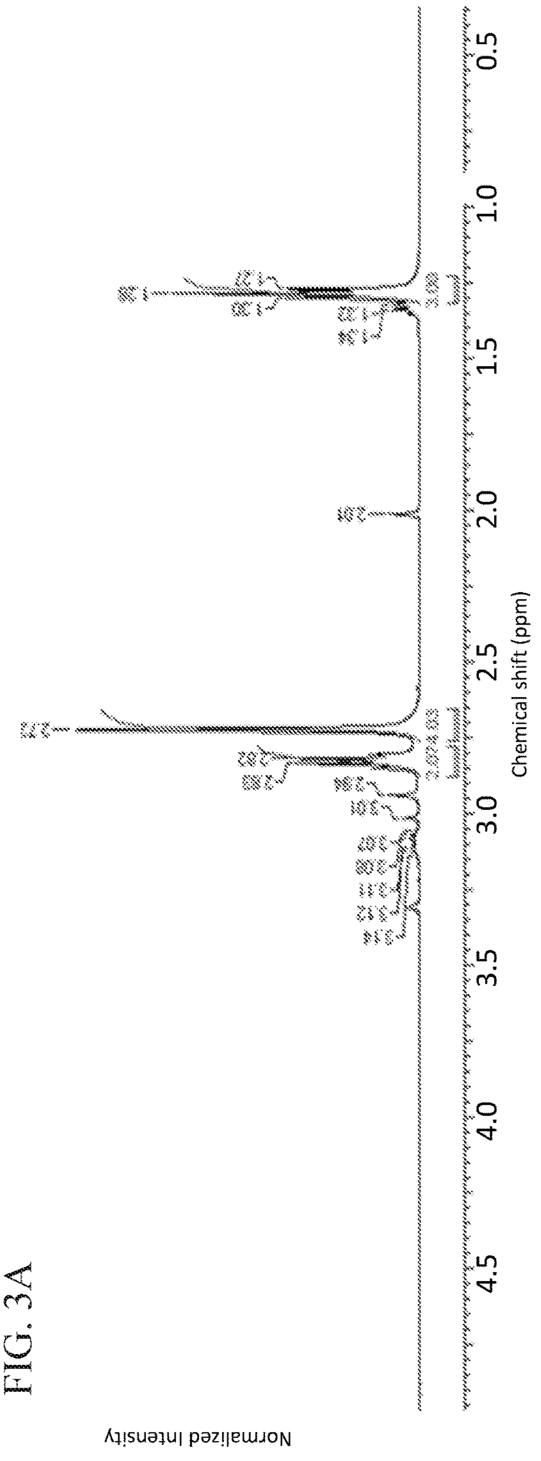
FIG. 3A is the experimental $^{1}$H-NMR spectrum of the polar, water-soluble ODSO fraction used in an example herein.
Figure 3B:
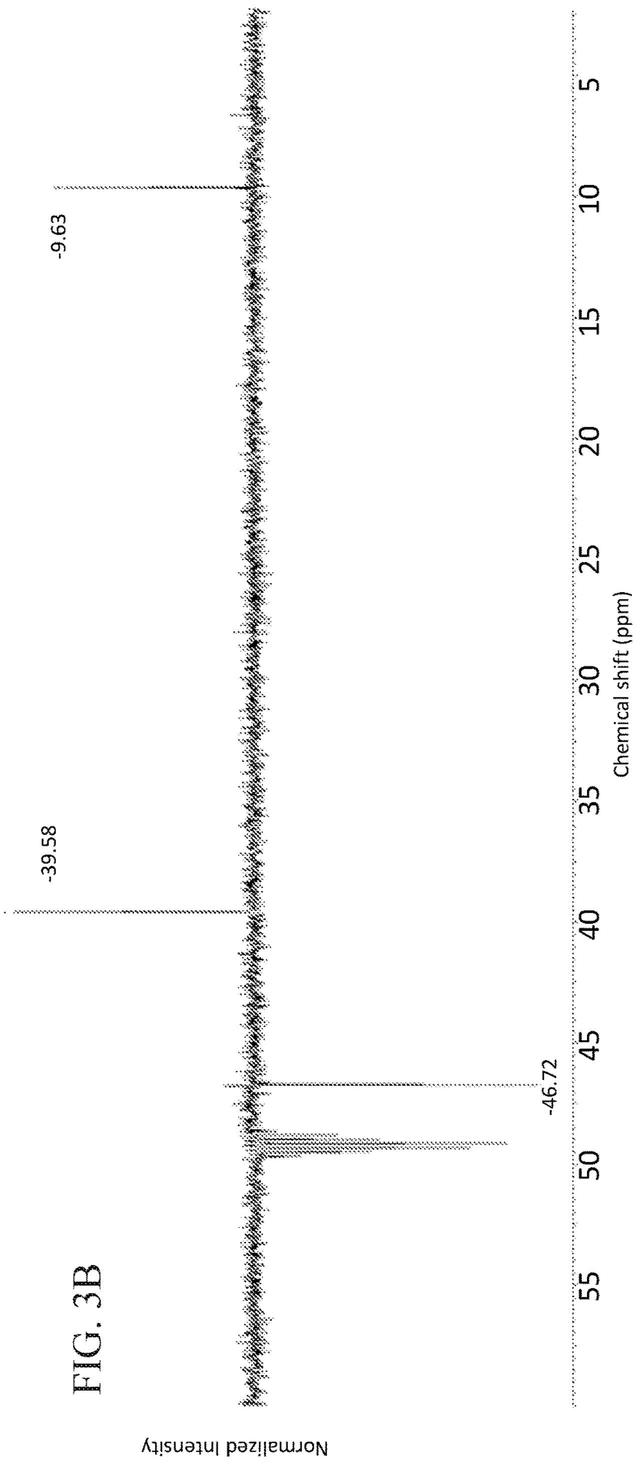
FIG. 3B is the experimental $^{13}$C-DEPT-135-NMR spectrum of the polar, water-soluble ODSO fraction used in an example herein.

Reference Example: The ODSO mixture used in the Example below was produced as disclosed in U.S. Pat. No. 10,781,168, incorporated by reference above, and in particular the fraction referred to therein as Composition 2. Catalytic oxidation a hydrocarbon refinery feedstock having 98 mass percent of C1 and C2 disulfide oils was carried out. The oxidation of the DSO compounds was performed in batch mode under reflux at atmospheric pressure, that is, approximately 1.01 bar. The hydrogen peroxide oxidant was added at room temperature, that is, approximately 23° C. and produced an exothermic reaction. The molar ratio of oxidant-to-DSO compounds (calculated based upon monosulfur content) was 2.90. After the addition of the oxidant was complete, the reaction vessel temperature was set to reflux at 80° C. for approximately one hour after which the water soluble ODSO was produced (referred to as Composition 2 herein and in U.S. Pat. No. 10,781,168) and isolated after the removal of water. The catalyst used in the oxidation of the DSO compounds was sodium tungstate. The Composition 2, referred to herein as "the selected water soluble ODSO fraction," was used. FIG. 3A is the experimental $^{1}$H-NMR spectrum of the polar, water soluble ODSO mixture that is the selected water soluble ODSO fraction in the example herein. FIG. 3B is the experimental $^{13}$C-DEPT-135-NMR spectrum of the polar, water soluble ODSO mixture that is the selected water soluble ODSO fraction in the example herein. The selected water soluble ODSO fraction was mixed with a $CD_3OD$ solvent and the spectrum was taken at 25° C. Methyl carbons have a positive intensity while methylene carbons exhibit a negative intensity. The peaks in the 48-50 ppm region belong to carbon signals of the $CD_3OD$ solvent.

When comparing the experimental $^{13}$C-DEPT-135-NMR spectrum of FIG. 3B for the selected water soluble ODSO fraction with a saved database of predicted spectra, it was found that a combination of the predicted alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) most closely corresponded to the experimental spectrum. This suggests that alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH) are major compounds in the selected water soluble ODSO fraction. It is clear from the NMR spectra shown in FIG. 3A and FIG. 3B that the selected water soluble ODSO fraction comprises a mixture of ODSO compounds that form the ODSO composition used in the present examples.

Example 1: Precursors for synthesis of CHA zeolite were provided in a comparative example, that is, in the absence of ODSO (ODSO/Na ratio=0). A quantity of 0.0745 g of sodium aluminate (54% $Al_2O_3$, 40% $Na_2O$) was weighed into a polytetrafluoroethylene (PTFE) liner (45 ml). Thereafter, 0.1715 g of a 50 wt. % sodium hydroxide solution and 2.6564 g of trimethyladamantylammonium hydroxide (25 wt. %) were added and the mixture was maintained under stirring until the Al source dissolved. A quantity of 0.9493 g of the silica source (100 wt. %) was mixed with 10.4082 g of water and added to the mixture of alumina and structure directing agent. The PTFE liner was positioned within an autoclave and transferred to an oven and heated to a temperature of 170° C. whilst rotating the autoclave. The autoclave was maintained at isothermal conditions for 38.5 hours. Thereafter, the product was washed with distilled water and dried. The dry mass was 0.9000 g, and was determined to be CHA zeolite.

Example 2: ODSO as described in the Reference Example was added to the homogeneous aqueous mixture used to synthesize CHA zeolite to replace an approximately equivalent amount of water as in the comparative Example 1, at an ODSO/Na ratio of about 2.22. Ratios of other components are approximately equivalent to those in the comparative Example 1, except that 83.3 mass % of structure directing agent was used. A quantity of 0.0747 g of sodium aluminate (54% $Al_2O_3$, 40% $Na_2O$) was weighed into a 45 mL PTFE liner. Thereafter, 0.1756 g of a 50 wt. % sodium hydroxide solution and 2.2213 g of trimethyladamantylammonium hydroxide (25 wt. %) were added and the mixture was maintained under stirring until the Al source dissolved. A quantity of 0.9478 g of the silica source (100 wt. %), 10.5810 g of water and 0.1614 g of ODSO were combined with the mixture of alumina and structure directing agent. The PTFE liner was positioned within an autoclave and transferred to an oven and heated to a temperature of 170° C. whilst rotating the autoclave. The autoclave was maintained at isothermal conditions for 38.5 hours. Thereafter, the product was washed with distilled water and dried. The dry mass was 0.9147 g, and was determined to be CHA zeolite.

Example 3: Similar to Example 2, ODSO as described in the Reference Example was added to the homogeneous aqueous mixture used to synthesize CHA zeolite to replace an approximately equivalent amount of water as in the comparative Example 1, except that the ODSO/Na ratio was increased to about 3.71. Ratios of other components are approximately equivalent to those in the comparative Example 1, except that 83.3 mass % of structure directing agent was used. A quantity of 0.0745 g of sodium aluminate (54% $Al_2O_3$, 40% $Na_2O$) was weighed into a 45 mL PTFE liner. Thereafter, 0.1750 g of a 50 wt. % sodium hydroxide solution and 2.2209 g of trimethyladamantylammonium hydroxide (25 wt. %) were added and the mixture was maintained under stirring until the Al source dissolved. A quantity of 0.9475 g of the silica source (100 wt. %), 10.4736 g of water and 0.2688 g of ODSO were combined with the mixture of alumina and structure directing agent. The PTFE liner was positioned within an autoclave and transferred to an oven and heated to a temperature of 170° C. whilst rotating the autoclave. The autoclave was maintained at isothermal conditions for 38.5 hours. Thereafter, the product was washed with distilled water and dried. The dry mass was 0.9509 g, and was determined to be CHA zeolite.

Example 4: Similar to Examples 2 and 3, ODSO as described in the Reference Example was added to the homogeneous aqueous mixture used to synthesize CHA zeolite to replace an approximately equivalent amount of water as in the comparative Example 1, except that the ODSO/Na ratio was further increased to about 4.74. Ratios of other components are approximately equivalent to those in the comparative Example 1. A quantity of 0.0745 g of sodium aluminate (54% $Al_2O_3$, 40% $Na_2O$) was weighed into a 45 mL PTFE liner. Thereafter, 0.1774 g of a 50 wt. % sodium hydroxide solution and 2.6690 g of trimethyladamantylammonium hydroxide (25 wt. %) were added and the mixture was maintained under stirring until the Al source dissolved. A quantity of 0.9476 g of the silica source (100 wt. %), 10.0614 g of water and 0.3468 g of ODSO were combined with the mixture of alumina and structure directing agent. The PTFE liner was positioned within an autoclave and transferred to an oven and heated to a temperature of 170° C. whilst rotating the autoclave. The autoclave was maintained at isothermal conditions for 38.5 hours. Thereafter, the product was washed with distilled water and dried. The dry mass was 1.0106 g, and was determined to be CHA zeolite.

Example 5: Similar to Examples 2-4, ODSO as described in the Reference Example was added to the homogeneous aqueous mixture used to synthesize CHA zeolite to replace an approximately equivalent amount of water as in the comparative Example 1, except that the ODSO/Na ratio was further increased to about 6.68. Ratios of other components are approximately equivalent to those in the comparative Example 1, except that 83.3 mass % of structure directing agent was used. A quantity of 0.0743 g of Sodium aluminate (54% $Al_2O_3$, 40% $Na_2O$) was weighed into a 45 mL PTFE liner. Thereafter, 0.1752 g of a 50 wt. % sodium hydroxide solution and 2.2213 g of trimethyladamantylammonium hydroxide (25 wt. %) were added and the mixture was maintained under stirring until the Al source dissolved. A quantity of 0.9475 g of the silica source (100 wt. %), 10.2588 g of water and 0.4835 g of ODSO were combined with the mixture of alumina and structure directing agent. The PTFE liner was positioned within an autoclave and transferred to an oven and heated to a temperature of 170° C. whilst rotating the autoclave. The autoclave was maintained at isothermal conditions for 38.5 hours. Thereafter, the product was washed with distilled water and dried. The dry mass was 1.0340 g, and was determined to be CHA zeolite.

Example 6: Similar to Examples 2-5, ODSO as described in the Reference Example was added to the homogeneous aqueous mixture used to synthesize CHA zeolite to replace an approximately equivalent amount of water as in the comparative Example 1, except that the ODSO/Na ratio was further increased to about 8.15. Ratios of other components are approximately equivalent to those in the comparative Example 1, except that 83.3 mass % of structure directing agent was used. A quantity of 0.0746 g of sodium aluminate (54% $Al_2O_3$, 40% $Na_2O$) was weighed into a 45 mL PTFE liner. Thereafter, 0.1754 g of a 50 wt. % sodium hydroxide solution and 2.2212 g of trimethyladamantylammonium hydroxide (25 wt. %) were added and the mixture was maintained under stirring until the Al source dissolved. A quantity of 0.9475 g of the silica source (100 wt. %), 10.1514 g of water and 0.5909 g of ODSO were combined with the mixture of alumina and structure directing agent. The PTFE liner was positioned within an autoclave and transferred to an oven and heated to a temperature of 170° C. whilst rotating the autoclave. The autoclave was maintained at isothermal conditions for 38.5 hours. Thereafter, the product was washed with distilled water and dried. The dry mass was 0.7383 g, and was determined to be amorphous material.

Figure 4:
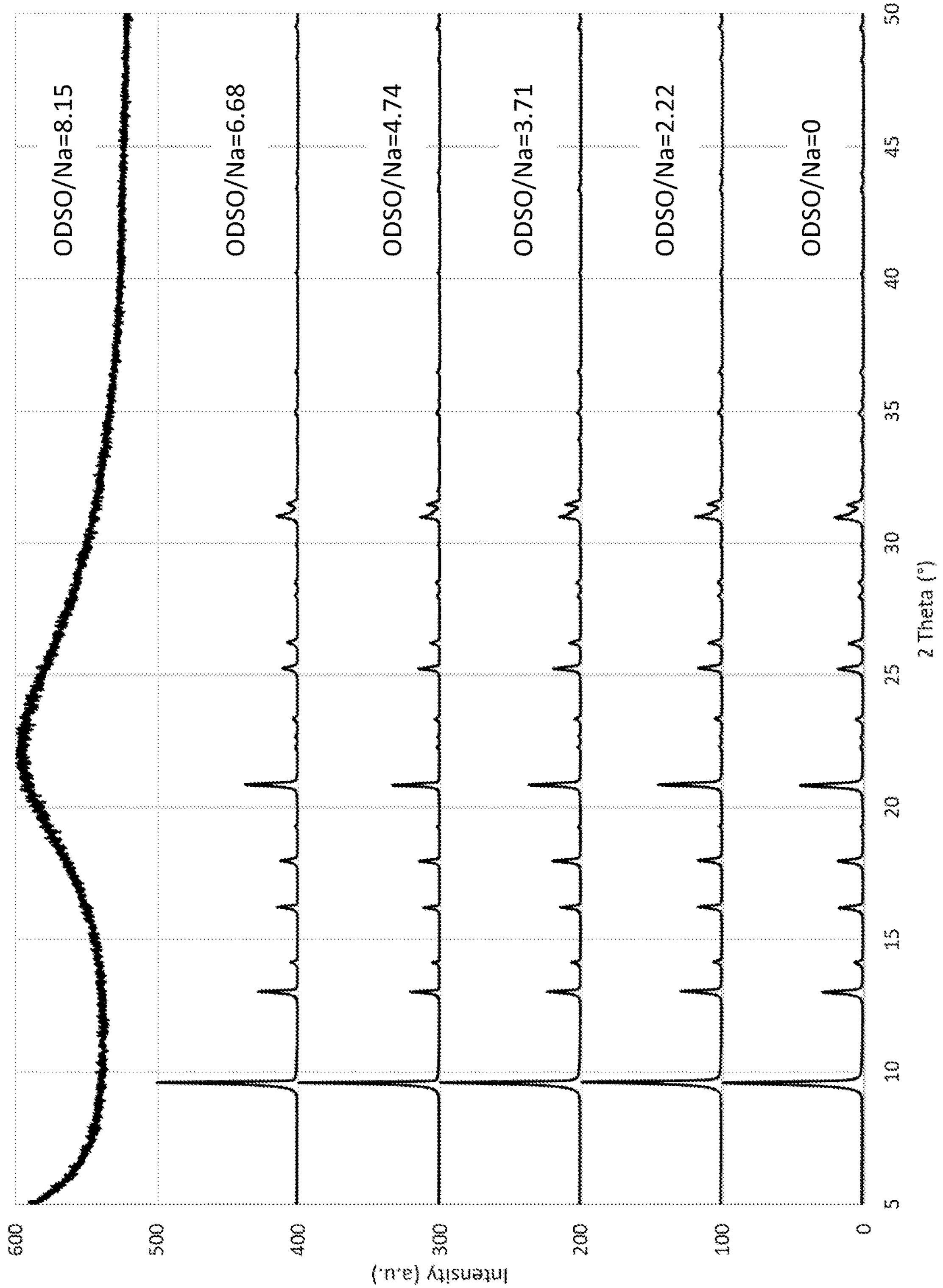
FIG. 4 shows X-ray powder diffraction patterns of the calcined products from the Examples 1-6.

FIG. 4 shows the X-ray powder diffraction patterns of the calcined zeolites from the above Examples 1-6 (where the powder patterns are normalized to the highest intensity peak, with the intensity level on the y-axis offset for clarity in the series of examples. It is clear from the peaks at that CHA zeolite has been produced in all cases from the peaks at about 8-35° (2 theta), except when the ODSO/Na ratio was highest. It is clear that ODSO can be successfully used in the synthesis of (CHA) zeolites, whilst controlling the ODSO/Na ratio is important to maintain within the (CHA) phase boundary. The addition of ODSO to the sol-gel maintained the structural integrity of the (CHA) framework. Accordingly, it is demonstrated that when (a) an ODSO-enhanced compositional ratio that is approximately equivalent to the baseline compositional ratio of silica source, alumina source, alkali metal source, water and structure directing agent (even with less structure directing agent) is used, which is known to be effective to produce CHA zeolite in the absence of ODSO, and (b) wherein the conditions and time of heating the ODSO-enhanced sol-gel is approximately equivalent to those that are effective to produce the CHA zeolite in the absence of ODSO, CHA zeolite is synthesized. For instance, in Example 1 herein (comparative), showing precursors that produce CHA zeolite in the absence of ODSO, a baseline compositional ratio of $Al_2O_3$:$SiO_2$:$Na_2O$:SDA:$H_2O$ on a molar basis is approximately 1 $Al_2O_3$:40 $SiO_2$:4 $Na_2O$:8 SDA:1760 $H_2O$. In each of the Examples 2-5, approximately equivalent conditions, times and ratios were used, except that an approximately equivalent mass of water was replaced with an ODSO component, and the ODSO-enhanced compositional ratio is approximately equivalent to the baseline compositional ratio for the comparative Example 1 for the alumina source, the silica source and the alkali metal source, and where the combined mass of utility water and ODSO is used as the relative water molar ratio. In addition, in Examples 2, 3, 5 and 6, a lesser amount of structure directing agent was used, where the compositional ratio of $Al_2O_3$:$SiO_2$:$Na_2O$:SDA:$H_2O$ on a molar basis is approximately 1 $Al_2O_3$:40 $SiO_2$:4 $Na_2O$:6.65 SDA:1760 $H_2O$, and where the combined mass of utility water and ODSO is used as the relative water molar ratio.

Figure 5:
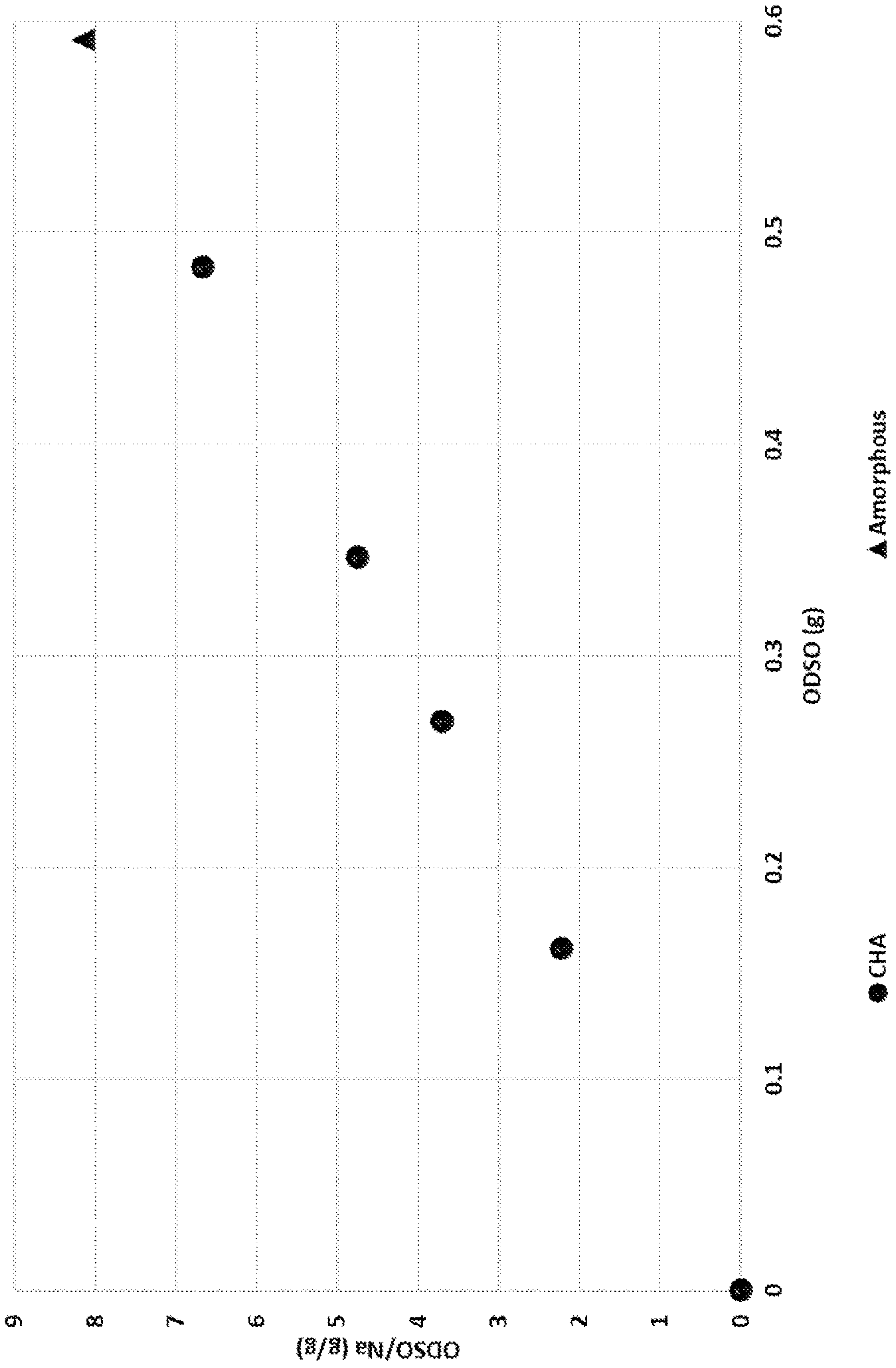
FIG. 5 is a plot of ODSO/Na ratios against ODSO mass.

Table 2 shows the normalized yield of CHA zeolite as a function of ODSO addition. It is clear that the ODSO addition increased the CHA zeolite yield. FIG. 5 is a plot of ODSO/Na ratios against ODSO mass demonstrating transition between crystalline products and amorphous products, for products formed according to the examples herein. The transition between crystalline products and amorphous products as a function of the ODSO/Na ratio is apparent.

Figure 6:
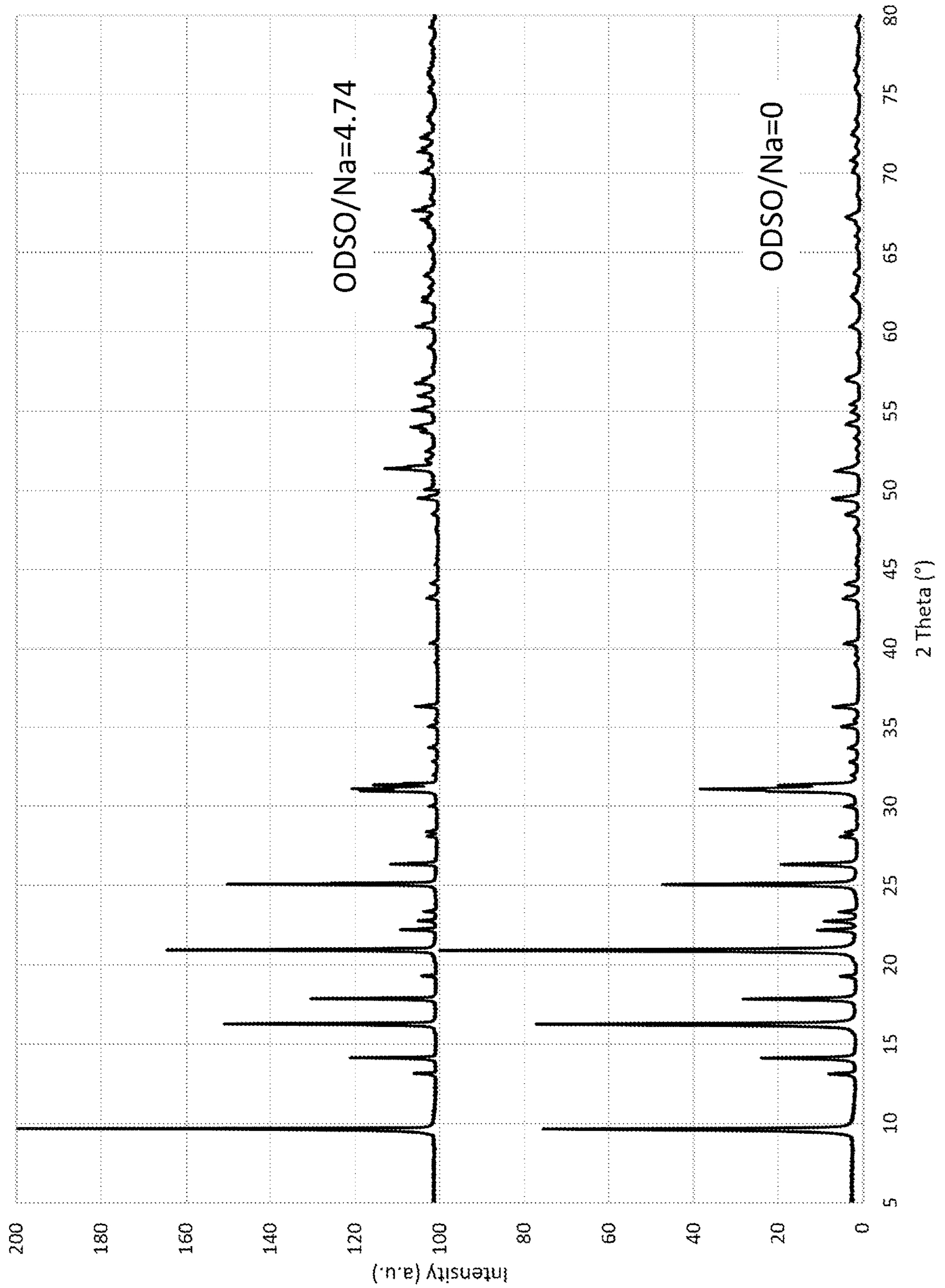
FIG. 6 shows X-ray powder diffraction patterns of the as-made products from the Examples 1 and 4.
Figure 7:
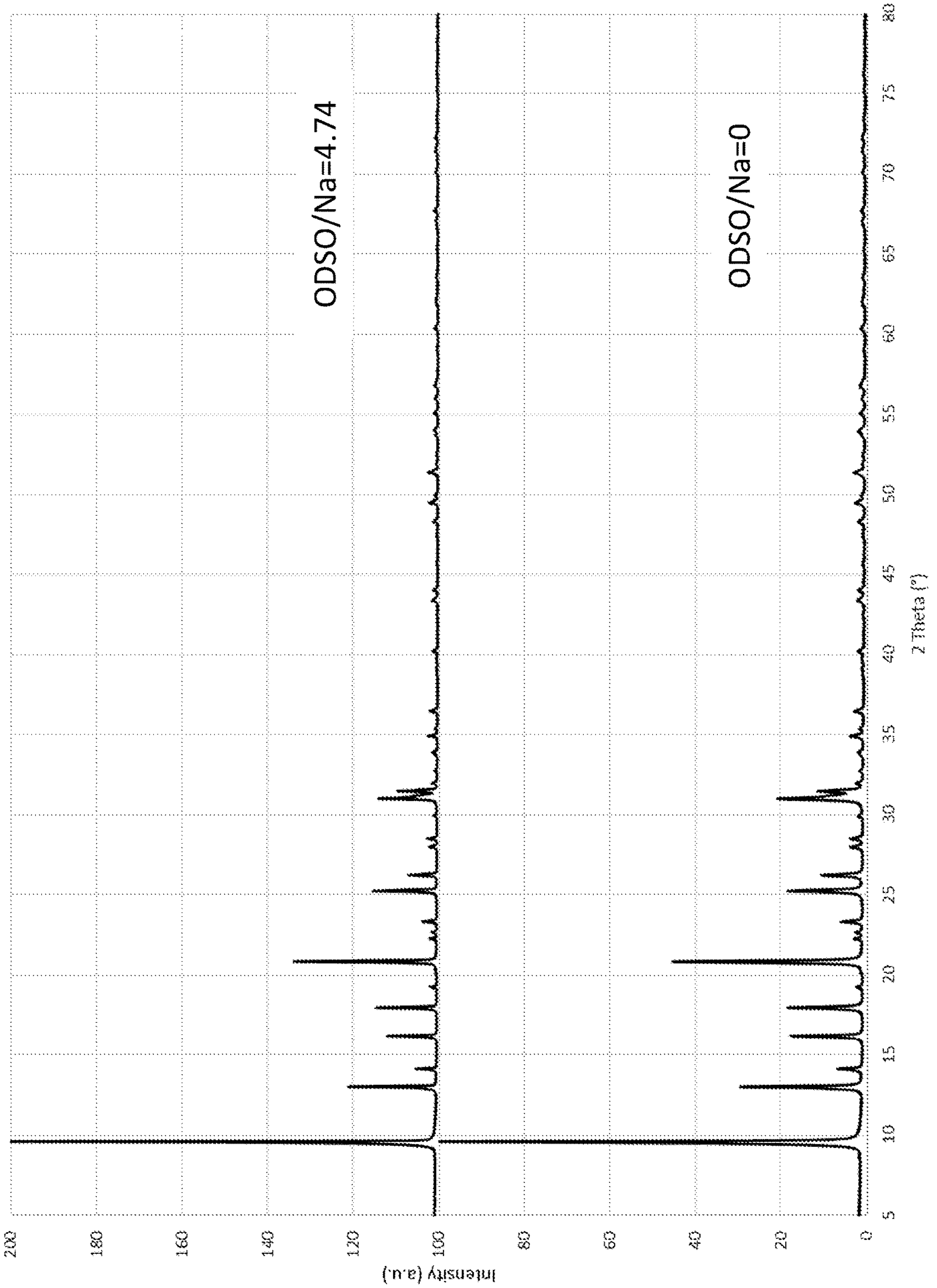
FIG. 7 shows X-ray powder diffraction patterns of the calcined products from the Examples 1 and 4.

Table 3 and Table 4 provide normalized intensity ($I/I_{rel}$) and relative intensities of the X-ray powder diffraction pattern of the as-made and calcined, respectively, CHA zeolites synthesized according to Example 1 (comparative in the absence of ODSO) and Example 4 in the presence of ODSO (ODSO/Na=4.74). The relative intensities are based on a strongest line in the X-ray pattern which is assigned a value of 100, where (W) [weak] is less than 20; (M) [medium] is between 20 and 50; (S) [strong] is between 50 and 80; and (VS) [very strong] is between 80 and 100. FIG. 6 and FIG. 7 show the X-ray powder diffraction patterns of the as-made and calcined, respectively, CHA zeolites of Examples 1 and 4, where the powder patterns are normalized to the highest intensity peak, and with the intensity level on the y-axis offset for clarity. Both examples show crystalline (CHA) zeolites. However, the relative peak intensities at approximately 9.6° and 21° (2 theta) are vastly different. The 100% peak ($I_{100}$) as shown in the as-made X-ray powder diffraction pattern is at approximately 9.6° (2 theta) for the sample synthesized in the presence of ODSO, whereas the corresponding 100% peak ($I_{100}$) is at approximately 21° (2 theta) for the sample synthesized in the absence of ODSO. The lower relative intensity of the 9.6° peak for the water-only synthesis is typically what is expected for as-made zeolites containing structure directing agents, and only after calcination is the relative intensity of this peak expected to increase and become the major $I_{100}$ peak. For the CHA zeolite synthesized in the presence of ODSO, the $I_{100}$ peak is the peak at 9.6° (2 theta) and is the as-made sample prior to calcination, which indicates that there is less structure directing agent in the sample prepared with ODSO than for the corresponding CHA zeolite prepared in the absence of ODSO.

Example 7: Precursors were provided in a comparative example, that is, in the absence of ODSO (ODSO/Na ratio=0), and in which 66.6 mass % of structure directing agent was used relative to the comparative Example 1. A quantity of 0.0744 g of sodium aluminate (54% $Ab_2O_3$, 40% $Na_2O$) was weighed into a 45 ml PTFE liner. Thereafter, 0.1763 g of a 50 wt. % sodium hydroxide solution and 1.7778 g of trimethyladamantylammonium hydroxide (25 wt. %) were added and the mixture was maintained under stirring until the Al source dissolved. A quantity of 0.9474 g of the silica source (100 wt. %) was mixed with 11.0700 g of water and added to the mixture of alumina and structure directing agent. The PTFE liner was positioned within an autoclave and transferred to an oven and heated to a temperature of 170° C. whilst rotating the autoclave. The autoclave was maintained at isothermal conditions for 38.5 hours. Thereafter, the product was washed with distilled water and dried. The dry mass was 0.6085 g, and was determined to be amorphous silica.

Example 8: ODSO as described in the Reference Example was added to the homogeneous aqueous mixture used to synthesize CHA zeolite to replace an approximately equivalent amount of water as in the comparative Example 7, at an ODSO/Na ratio of about 5.27. Ratios of other components are approximately equivalent to those in the comparative Example 7. A quantity of 0.0744 g of sodium aluminate (54% $Al_2O_3$, 40% $Na_2O$) was weighed into a 45 mL PTFE liner. Thereafter, 0.1751 g of a 50 wt. % sodium hydroxide solution and 1.7784 g of trimethyladamantylammonium hydroxide (25 wt. %) were added and the mixture was maintained under stirring until the Al source dissolved. A quantity of 0.9475 g of the silica source (100 wt. %), 10.6900 g of water and 0.3815 g of ODSO were combined with the mixture of alumina and structure directing agent. The PTFE liner was positioned within an autoclave and transferred to an oven and heated to a temperature of 170° C. whilst rotating the autoclave. The autoclave was maintained at isothermal conditions for 38.5 hours. Thereafter, the product was washed with distilled water and dried. The dry mass was 0.9147 g, and was determined to be CHA zeolite.

Figure 8:
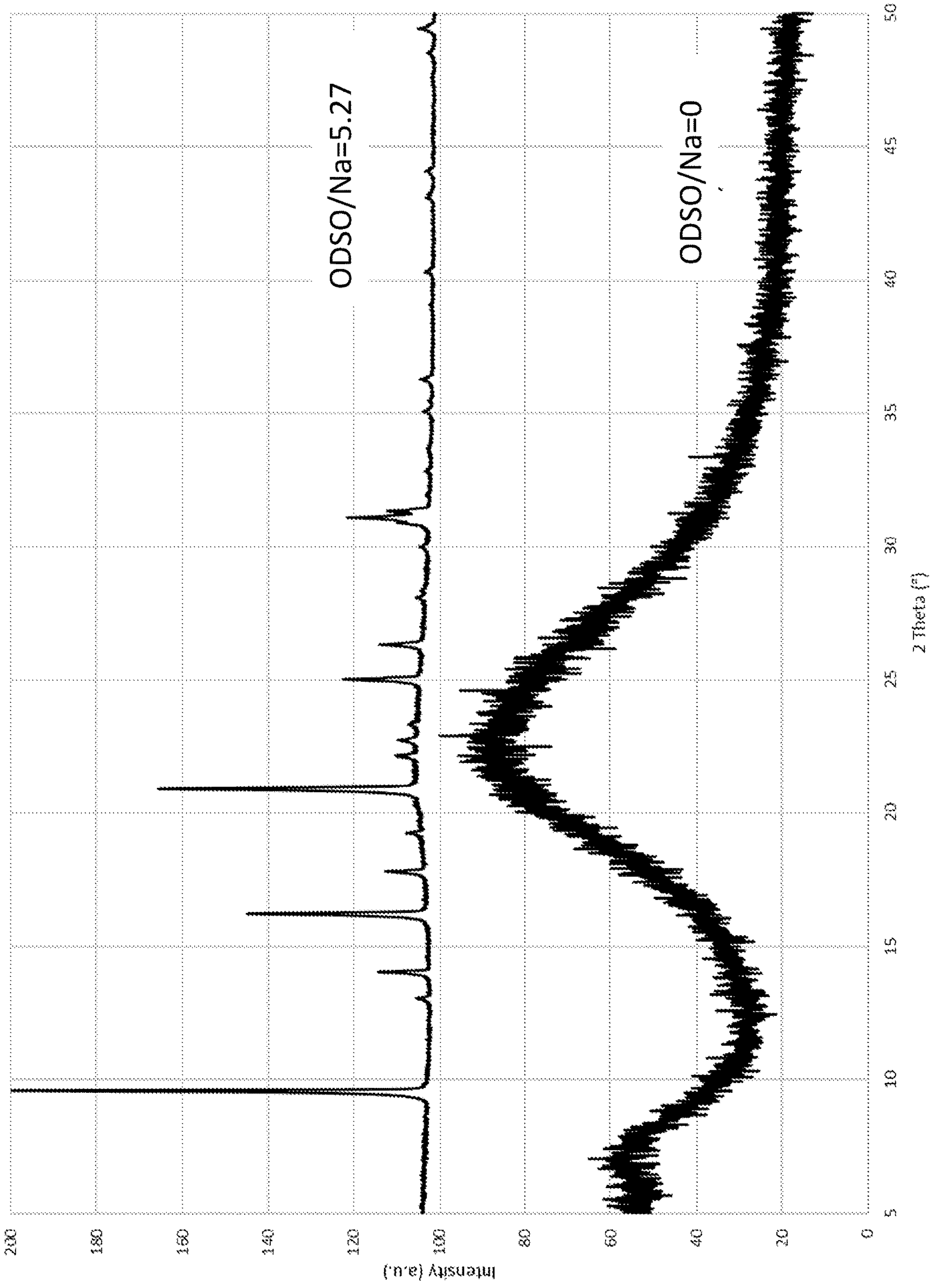
FIG. 8 shows X-ray powder diffraction patterns of the calcined products from the Examples 7-8.

FIG. 8 shows the X-ray diffraction patterns of the zeolites from the above Examples 7-8 (with the intensity level on the y-axis offset for clarity). It is clear from the peaks at that CHA zeolite has been produced when ODSO is used from the peaks at about 8-35° (2 theta), and that without ODSO the product was amorphous silica. Accordingly, it is demonstrated that when (a) an ODSO-enhanced compositional ratio that is approximately equivalent to the baseline compositional ratio of silica source, alumina source, alkali metal source, water and structure directing agent is used, which is known to be ineffective to produce CHA zeolite in the absence of ODSO but rather produces amorphous silica, and (b) wherein the conditions and time of heating the ODSO-enhanced sol-gel is approximately equivalent to those that are effective to produce the amorphous silica, CHA zeolite is synthesized. For instance, in Example 7 herein (comparative), showing precursors that produce amorphous silica in the absence of ODSO, a baseline compositional ratio of $Al_2O_3$:$SiO_2$:$Na_2O$:SDA:$H_2O$ on a molar basis is approximately 1:40:4:5.34:1760. In the Example 8, CHA zeolite is synthesized using approximately equivalent conditions, times and ratios were used, except that an approximately equivalent mass of water was replaced with an ODSO component, and hence the ODSO-enhanced compositional ratio is approximately equivalent to the baseline compositional ratio for the comparative Example 7, and where the combined mass of utility water and ODSO is used as the relative water molar ratio.

As used herein, "approximately equivalent" as concerning the amount of ODSO that replaces water, the cumulative amount of ODSO and water, the component molar or mass ratios, and/or the hydrolysis conditions and time, is within a margin of less than or equal to plus or minus 1, 2, 5 or 10% of the compared value.

It is to be understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Notably, the figures and examples above are not meant to limit the scope of the present disclosure to a single implementation, as other implementations are possible by way of interchange of some or all the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific implementations will so fully reveal the general nature of the disclosure that others can, by applying knowledge within the skill of the relevant art(s), readily modify and/or adapt for various applications such specific implementations, without undue experimentation, without departing from the general concept of the present disclosure. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown are drawings accordingly to one example and other dimensions can be used without departing from the disclosure.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

TABLE 1

| ODSO Name | Formula | Structure Examples |
|---|---|---|
| Dialkyl-sulfonesulfoxide Or 1,2-alkyl-alkyl-disulfane 1,1,2-trioxide | (R—SOO—SO—R') | 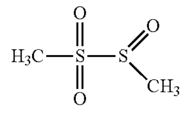 1,2-Dimethyldisulfane 1,1,2-trioxide |
| Dialkyl-disulfone Or 1,2 alkyl-alkyl-disulfane 1,1,2,2-tetraoxide | (R—SOO—SOO—R') | 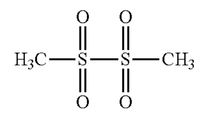 1,2-Dimethyldisulfane 1,1,2,2-tetraoxide |

TABLE 1-continued

| ODSO Name | Formula | Structure Examples |
|---|---|---|
| Alkyl-sulfoxidesulfonate | (R—SO—SOO—OH) | 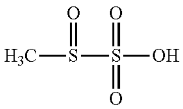 Methylsulfanesulfonic acid oxide |
| Alkyl-sulfonesulfonate | (R—SOO—SOO—OH) | 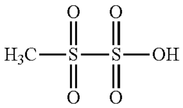 1-Hydroxy-2-methyldisulfane 1,1,2,2-tetraoxide |
| Alkyl-sulfoxidesulfinate | (R—SO—SO—OH) | 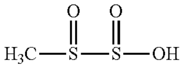 1-Hydroxy-2-methyldisulfane 1,2-dioxide |
| Alkyl-sulfonesulfinate | (R—SOO—SO—OH) | 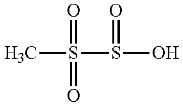 Methylsulfanesulfinic acid dioxide |

R and R' can be the same or different alkyl or aryl groups comprising 1-10 carbon atoms.

TABLE 2

| ODSO/Na Ratio (w/w) | | |
|---|---|---|
| Na from Alkali | Na (total) | Normalized Yield |
| 0 | 0 | 1.00 |
| 3.20 | 2.22 | 1.02 |
| 5.34 | 3.71 | 1.06 |
| 6.80 | 4.74 | 1.12 |
| 9.60 | 6.68 | 1.15 |
| 11.72 | 8.15 | 0.82 |

An ODSO/Na ratio = 0 is a water-only synthesis in the absence of the ODSO

TABLE 3

| ODSO/Na = 0 | | | ODSO/Na = 4.74 | | |
|---|---|---|---|---|---|
| 2 theta | $I/I_{rel}$ | Relative | 2 theta | $I/I_{rel}$ | Relative |
| 9.64 | 75.4 | VS | 9.66 | 100 | VS |
| 13.11 | 8.1 | W | 13.13 | 6.2 | W |
| 14.11 | 23.9 | M | 14.13 | 21.2 | M |
| 16.27 | 77.2 | VS | 16.29 | 50.9 | S |
| 17.88 | 28.3 | M | 17.89 | 30.4 | M |
| 19.28 | 5.3 | W | 19.31 | 4.4 | W |
| 20.93 | 100 | VS | 20.96 | 64.5 | VS |
| 22.21 | 10.8 | W | 22.23 | 9.4 | W |
| 22.77 | 9.1 | W | 22.79 | 5.2 | W |
| 23.36 | 5.7 | W | 23.38 | 4 | W |
| 25.08 | 47.3 | S | 25.1 | 50.3 | S |
| 26.34 | 19.3 | W | 26.36 | 11.7 | W |
| 28.11 | 5.2 | W | 28.11 | 3 | W |
| 28.38 | 4.2 | W | 28.4 | 3.3 | W |
| 29.99 | 4.4 | W | 30.02 | 2.6 | W |
| 31.09 | 38.5 | M | 30.97 | 18.8 | W |
| 31.36 | 20 | W or M | 31.12 | 20.9 | M |
| 32.07 | 2.3 | W | 31.38 | 15.8 | W |
| 32.84 | 3.1 | W | 32 | 1.7 | W |
| 33.72 | 3.5 | W | 32.81 | 1.8 | W |
| 35.07 | 5.1 | W | 33.75 | 2.7 | W |

TABLE 4

| ODSO/Na = 0 | | | ODSO/Na = 4.74 | | |
|---|---|---|---|---|---|
| 2 theta | $I/I_{rel}$ | Relative | 2 theta | $I/I_{rel}$ | Relative |
| 9.58 | 100 | VS | 9.6 | 100 | VS |
| 13.02 | 29.6 | M | 13.02 | 21.1 | M |
| 14.12 | 6.8 | W | 14.13 | 5.5 | W |
| 16.2 | 17.8 | W | 16.2 | 12.1 | W |
| 17.98 | 18.4 | W | 17.98 | 14.6 | W |
| 19.28 | 2.4 | W | 19.27 | 2.1 | W |
| 20.83 | 45.5 | M | 20.84 | 33.9 | M |
| 22.28 | 2.9 | W | 22.28 | 2.1 | W |
| 22.67 | 2.6 | W | 22.67 | 1.7 | W |
| 23.31 | 6 | W | 23.32 | 3.9 | W |
| 25.23 | 18.4 | W | 25.24 | 15.4 | W |
| 26.2 | 10.7 | W | 26.22 | 7.2 | W |
| 27.97 | 3.9 | W | 27.99 | 2.2 | W |
| 28.49 | 3.9 | W | 28.49 | 2.8 | W |
| 29.91 | 2 | W | 29.91 | 1.4 | W |
| 30.97 | 20.9 | M | 30.98 | 14.1 | W |
| | | | 31.15 | 6.1 | W |
| 31.44 | 11.4 | W | 31.45 | 9.6 | W |
| 31.96 | 2.6 | W | 31.99 | 1.7 | W |
| 32.72 | 1.8 | W | 32.75 | 1 | W |
| 33.88 | 2.1 | W | 33.91 | 1.5 | W |
| 34.92 | 3.8 | W | 34.93 | 2.5 | W |

The invention claimed is:

1. A method for synthesis of CHA framework crystalline material comprising:

forming a homogeneous aqueous mixture of a silica source, a framework metal oxide source selected from compounds of Al, Fe, B and Ga, an alkali metal source, an optional structure directing agent, water and an effective amount of water-soluble oxidized disulfide oil (ODSO); and heating the homogeneous aqueous mixture under conditions and for a time effective for crystallization and to form a precipitate suspended in a supernatant as an intermediate suspension, wherein the precipitate comprises CHA framework crystalline material.

2. The method of claim 1, wherein the CHA framework crystalline material comprises at least about 0.1 mass % of the precipitate.

3. The method of claim 1, wherein the CHA framework crystalline material has the general formula $SiO_2$:$nY_2O_3$, where Y=Al, Fe, B or Ga and n=0.002-0.1, 0.002-0.2, 0.004-0.1 or 0.02-0.1.

4. The method of claim 3, wherein Y=Al, and wherein the CHA framework crystalline material is chabazite zeolite.

5. The method of claim 4, wherein a silica-to-alumina molar ratio of the chabazite zeolite is in the range of about 5-100.

6. The method of claim 1, wherein the CHA framework crystalline material recovered as precipitate is calcined at a suitable temperature, temperature ramp rate and for a suitable period of time to realize porous CHA framework crystalline material.

7. The method of claim 1, wherein the alkali metal source is a mineralizer selected from the group consisting of NaOH, KOH, RbOH, LiOH, CsOH and combinations comprising two or more of the foregoing mineralizers.

8. The method of claim 1, where the framework metal oxide is alumina, and wherein the alkali metal source is sodium and the mass ratio of ODSO to sodium is in the range of about 0.1-7.5.

9. The method of claim 1, wherein a cumulative amount of ODSO and water is approximately equivalent to an amount of water that is effective to produce CHA framework crystalline material in the absence of ODSO;

the cumulative amount of ODSO and water, an amount of the silica source, an amount of the framework metal oxide source, an amount of the alkali metal source, and an amount of the optional structure directing agent are provided at an ODSO-enhanced compositional ratio;

the ODSO-enhanced compositional ratio is approximately equivalent to a baseline compositional ratio of water, silica source, framework metal oxide source, alkali metal source and optional structure directing agent, the baseline compositional ratio being effective to produce CHA framework crystalline material in the absence of ODSO; and the conditions and time of heating are approximately equivalent to those that are effective to produce CHA framework crystalline material in the absence of ODSO.

10. The method of claim 1, wherein a cumulative amount of ODSO and water is approximately equivalent to an amount of water that is effective to produce amorphous silica or amorphous silica-alumina in the absence of ODSO;

the cumulative amount of ODSO and water, an amount of the silica source, an amount of the framework metal oxide source, an amount of the alkali metal source, and an amount of the optional structure directing agent are provided at an ODSO-enhanced compositional ratio;

the ODSO-enhanced compositional ratio is approximately equivalent to a baseline compositional ratio of water, silica source, framework metal oxide source, alkali metal source and optional structure directing agent, the baseline compositional ratio being effective to produce amorphous silica or amorphous silica-alumina in the absence of ODSO; and the conditions and time of heating are approximately equivalent to those that are effective to produce amorphous silica or amorphous silica-alumina in the absence of ODSO.

11. The method of claim 1, wherein the framework metal oxide is alumina and the framework metal oxide source is selected from the group consisting of aluminates, alumina, other zeolites, aluminum colloids, boehmites, pseudo-boehmites, aluminum hydroxides, aluminum salts, aluminum alkoxides, aluminum wire and alumina gels.

12. The method of claim 1, wherein the silica source is selected from the group consisting of sodium silicate (water glass), rice husk, fumed silica, precipitated silica, colloidal silica, silica gels, zeolites, dealuminated zeolites, silicon hydroxides and silicon alkoxides.

13. The method of claim 1, wherein the structure directing agent is used to stabilize the structure of the CHA framework crystalline material, and wherein the structure directing agent includes one or more compounds selected from the group consisting of quaternary ammonium ions, adamantamine derivatives including N,N,N-trimethyl-1-adamantammonium, quinuclidinol derivatives including N-methyl-3-quinuclidinol, cyclohexyl derivatives, and cyclohexylmethyl derivatives including trimethyl(cyclohexylmethyl)ammonium.

14. The method of claim 1, wherein crystallization occurs in the presence of a seed, and wherein the seed is selected from the group consisting of chabazite zeolite and faujasite zeolite.

15. The method of claim 1, wherein the homogeneous aqueous mixture is optionally aged before being subjected to heating for a period of about 0-48 hours;

wherein the homogeneous aqueous mixture is heated at a temperature in the range of about 120-190° C.;

wherein the homogeneous aqueous mixture is heated at autogenous pressure or a pressure in the range of atmospheric to 17 bar; and wherein the homogeneous aqueous mixture is heated for a time period within the range of about 0.5-6 days.

16. The method of claim 1, wherein the ODSO is derived from oxidation of disulfide oil compounds present in an effluent refinery hydrocarbon stream recovered following catalytic oxidation of mercaptans present in a mercaptan-containing hydrocarbon stream.

17. The method of claim 1, wherein the one or more ODSO compounds comprise ODSO compounds having 3 or more oxygen atoms and 1 to 20 carbon atoms, and are contained in a mixture having an average density greater than about 1.0 g/cc and an average boiling point greater than about 80° C.

18. The method of claim 1, wherein the ODSO compounds have 3 or more oxygen atoms and include:

one or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR);

two or more compounds selected from the group consisting of (R—SOO—SO—R'), (R—SOO—SOO—R'), (R—SO—SOO—OH), (R—SOO—SOO—OH), (R—SOO—SO—OH), (R'—SO—SO—OR), (R'—SOO—SO—OR), (R'—SO—SOO—OR) and (R'—SOO—SOO—OR);

one or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH); or two or more compounds selected from the group consisting of (R—SOO—SO—R'), (R—SOO—SOO—R'), (R—SO—SOO—OH), (R—SOO—SOO—OH), (R—SO—SO—OH), (R—SOO—SO—OH);

wherein R and R' are the same or different C1-C10 alkyl or C6-C10 aryl groups.

* * * * *